US012620311B2

(12) United States Patent
Iriya et al.

(10) Patent No.: US 12,620,311 B2
(45) Date of Patent: May 5, 2026

(54) INFORMATION PROCESSING APPARATUS, INFORMATION PROCESSING METHOD, AND PROGRAM

(71) Applicants: Sony Group Corporation, Tokyo (JP); Sony Semiconductor Solutions Corporation, Kanagawa (JP)

(72) Inventors: Shinichi Iriya, Kanagawa (JP); Katsuji Miyazawa, Tokyo (JP); Satoshi Akagawa, Kanagawa (JP)

(73) Assignees: Sony Group Corporation, Tokyo (JP); Sony Semiconductor Solutions Corporation, Kanagawa (JP)

( * ) Notice: Subject to any disclaimer, the term of this patent is extended or adjusted under 35 U.S.C. 154(b) by 17 days.

(21) Appl. No.: 18/282,376

(22) PCT Filed: Feb. 3, 2022

(86) PCT No.: PCT/JP2022/004249
§ 371 (c)(1),
(2) Date: Sep. 15, 2023

(87) PCT Pub. No.: WO2022/201892
PCT Pub. Date: Sep. 29, 2022

(65) Prior Publication Data
US 2024/0412632 A1 Dec. 12, 2024

(30) Foreign Application Priority Data

Mar. 24, 2021 (JP) ................................. 2021-049561
Apr. 6, 2021 (JP) ................................. 2021-064801

(51) Int. Cl.
*G08G 1/14* (2006.01)
*B60K 35/28* (2024.01)
(Continued)

(52) U.S. Cl.
CPC ............. *G08G 1/143* (2013.01); *B60K 35/28* (2024.01); *B60W 50/14* (2013.01);
(Continued)

(58) Field of Classification Search
CPC ........ G08G 1/143; G08G 1/168; B60K 35/28; B60K 2360/176; B60K 2360/188;
(Continued)

(56) References Cited

U.S. PATENT DOCUMENTS 9,286,803 B2 * 3/2016 Tippelhofer ....... G01C 21/3685
10,179,543 B2 * 1/2019 Rathi ..................... H04N 23/45
(Continued)

FOREIGN PATENT DOCUMENTS

EP 1 642 768 A1 4/2006
JP 2003132349 A 5/2003
(Continued)

OTHER PUBLICATIONS

PCT/JP2022/004249, May 11, 2022, International Search Report and Written Opinion.
(Continued)

*Primary Examiner* — Daryl C Pope
(74) *Attorney, Agent, or Firm* — XSENSUS LLP

(57) ABSTRACT

There is provided an information processing apparatus, including a display data generation unit configured to receive an image obtained by imaging surroundings of a vehicle, generate display data representing at least one parking division area, and superimpose the display data on the image, wherein the display data include an upward extension surface extending from a vehicle contact surface of the at least one parking division area.

20 Claims, 26 Drawing Sheets

(51) Int. Cl.
　　B60W 50/14　　　　(2020.01)
　　G06V 20/58　　　　(2022.01)

(52) U.S. Cl.
　　CPC ...... G06V 20/586 (2022.01); B60K 2360/176
　　　　(2024.01); B60K 2360/188 (2024.01); B60W
　　　　2050/146 (2013.01); B60W 2420/403
　　　　　　　　　　　　　　　　　　(2013.01)

(58) Field of Classification Search
　　CPC ........... B60W 50/14; B60W 2050/146; B60W
　　　　　　　2420/403; G06V 20/586; B60Q 9/002;
　　　　　　　　　　　　　　B60R 1/27; B62D 15/027
　　See application file for complete search history.

(56)　　　　　　References Cited

U.S. PATENT DOCUMENTS

| | | | |
|---|---|---|---|
| 11,999,342 B2 * | 6/2024 | Obora ........................ | G06T 7/70 |
| 2001/0030688 A1 | 10/2001 | Asahi et al. | |
| 2006/0080005 A1 | 4/2006 | Lee et al. | |
| 2007/0146165 A1 * | 6/2007 | Tanaka ............... | B62D 15/0285 |
| | | | 348/148 |

| | | | |
|---|---|---|---|
| 2013/0010119 A1 * | 1/2013 | Mitsugi .................. | H04N 7/183 |
| | | | 348/148 |
| 2016/0207526 A1 * | 7/2016 | Franz ..................... | G08G 1/168 |
| 2018/0345955 A1 * | 12/2018 | Kim ................... | B62D 15/0285 |
| 2020/0001923 A1 | 1/2020 | Kamiyama | |
| 2020/0180510 A1 * | 6/2020 | Suzuki ................. | H04N 23/698 |
| 2020/0302657 A1 * | 9/2020 | Shimazu ............... | H04N 23/54 |
| 2020/0369204 A1 * | 11/2020 | Suzuki ................... | G08G 1/143 |

FOREIGN PATENT DOCUMENTS

| | | | |
|---|---|---|---|
| JP | 2005175603 A | 6/2005 | |
| JP | 2011039600 A | 2/2011 | |
| JP | 2013091330 A | 5/2013 | |
| JP | 2016-118851 A | 6/2016 | |
| JP | 2019067220 A | 4/2019 | |
| WO | WO-2009136559 A1 | 11/2009 | |
| WO | WO 2012/143033 A1 | 10/2012 | |

OTHER PUBLICATIONS

International Search Report and Written Opinion mailed May 11, 2022 in connection with International Application No. PCT/JP2022/004249.

* cited by examiner

INFORMATION PROCESSING APPARATUS, INFORMATION PROCESSING METHOD, AND PROGRAM

CROSS-REFERENCE TO RELATED APPLICATIONS

This application claims the benefit under 35 U.S.C. § 371 as a U.S. National Stage Entry of International Application No. PCT/JP2022/004249, filed in the Japanese Patent Office as a Receiving Office on Feb. 3, 2022, which claims priority to Japanese Priority Patent Application JP 2021-049561 filed Mar. 24, 2021, and Japanese Priority Patent Application JP 2021-064801 filed Apr. 6, 2021, the entire contents of each of which are incorporated herein by reference.

TECHNICAL FIELD

The present disclosure relates to an information processing apparatus, an information processing method, and a program. Specifically, the present disclosure relates to, for example, an information processing apparatus, an information processing method, and a program that generate display data for simply presenting a parkable space of a vehicle to a user who is a vehicle driver in a parking lot.

BACKGROUND ART

For example, many parking lots of a shopping center, an amusement park, a tourist spot, other places in a city, and the like often allow a large number of vehicles to be parked. A user who is a driver of a vehicle searches for an empty space in which the vehicle can be parked from the parking lot and parks the vehicle. In this case, the user runs the vehicle in the parking lot and visually checks the surroundings to search for an empty space.

It takes time to perform such checking of a parkable space, and there is a problem that driving in a small parking lot is likely to cause contact accidents with other vehicles and people.

Examples of an existing technology that discloses a configuration for solving such a problem include Patent Literature 1 (Japanese Patent Application Laid-open No. 2016-118851).

Patent Literature 1 discloses a configuration in which display data that makes it possible to identify whether or not each parking area in a parking lot is parkable is displayed on a display unit in a vehicle to be parked, the driver of the vehicle being capable of checking the display unit. Specifically, Patent Literature 1 discloses a configuration in which an image of a line-shaped virtual image attached to a ground position in front of each parking space in the parking lot is generated and displayed, the virtual image making it possible to identify whether or not each parking space is parkable.

The configuration disclosed in Patent Literature 1 presents, for example, an image of green line and a red or blue line respectively attached to a parkable position and a non-parkable position on the ground in front of the vehicle parking space.

However, these lines have the same shape in both the parkable position and the non-parkable position and are simply different in color, so that it is difficult for a user who is a driver to recognize the lines. In addition, a blue, red, or green line is actually painted on a running surface of a parking lot in some cases. In the case where lines of various colors are present in a parking lot, there is a possibility that a driver confuses the line of a virtual image displayed on the display unit with the actual line.

CITATION LIST

Patent Literature

PTL 1: Japanese Patent Application Laid-open No. 2016-118851

SUMMARY

Technical Problem

In view of the circumstances as described above, it is desired to provide, for example, an information processing apparatus, an information processing method, and a program that generate display data for simply presenting a parkable space of a vehicle to a user who is a vehicle driver in a parking lot.

Solution to Problem

According to a first aspect of the present disclosure, there is provided an information processing apparatus, including: a display data generation unit configured to receive an image obtained by imaging surroundings of a vehicle, generate display data representing at least one parking division area, and superimpose the display data on the image, wherein the display data include an upward extension surface extending from a vehicle contact surface of the at least one parking division area.

Further, according to a second aspect of the present disclosure, there is provided a method for presenting a parkable space to a driver of a vehicle, the method comprising, receiving an image obtained by imaging surroundings of the vehicle, generating space-identifying display data representing at least one parking division area, the space-identifying display data comprising an upward extension surface extending from a vehicle contact surface of the at least one parking division area, and superimposing the display data on the image.

Further, according to a third aspect of the present disclosure, there is provided an apparatus, comprising at least one computer-readable storage medium having stored thereon executable instructions, at least one processor programmed by the executable instructions to perform a method comprising acts of, receiving an image obtained by imaging surroundings of a vehicle, generating space-identifying display data representing at least one parking division area, the space-identifying display data comprising an upward extension surface extending from a vehicle contact surface of the at least one parking division area, and superimposing the display data on the image.

Note that a program according to an embodiment of the present disclosure is, for example, a program that can be provided by a storage medium or a communication medium provided in a computer-readable format to an information processing apparatus, an image processing apparatus, and a computer system capable of executing various program codes. By providing such a program in a computer-readable format, processing according to the program can be realized on the information processing apparatus and the computer system.

Still other objects, features, and advantages of the present disclosure will be clarified by more detailed description based on examples described below and the ac-companying drawings. Note that a system herein is a logical collection of a plurality of apparatuses, and is not limited one in which apparatuses having respective configurations are situated in a single housing.

In accordance with a configuration of an embodiment of the present disclosure, a configuration that makes it possible to generate display data and display the display data on a display unit is realized, the display data making it possible to easily and reliably identify a parkable space and a non-parkable space. Specifically, for example, there is provided a display data generation unit that generates display data obtained by superimposing, as graphic data, space-identifying display data of at least one of a parkable space or a non-parkable space on an image obtained by imaging surroundings of a vehicle. The display data generation unit generates display data obtained by superimposing, as fence-type or box-type graphic data having an upward extension surface extending upward from a vehicle contact surface, the space-identifying display data of at least one of a parkable space or a non-parkable space on the image, outputs the display data to a display unit, and displays the display data. With this configuration, a configuration that makes it possible to generate display data and display the display data on a display unit is realized, the display data making it possible to easily and reliably identify a parkable space and a non-parkable space. Note that the effects described herein are not limitative but are merely illustrative, and additional effects may be provided.

DESCRIPTION OF EMBODIMENTS

Figure 1:
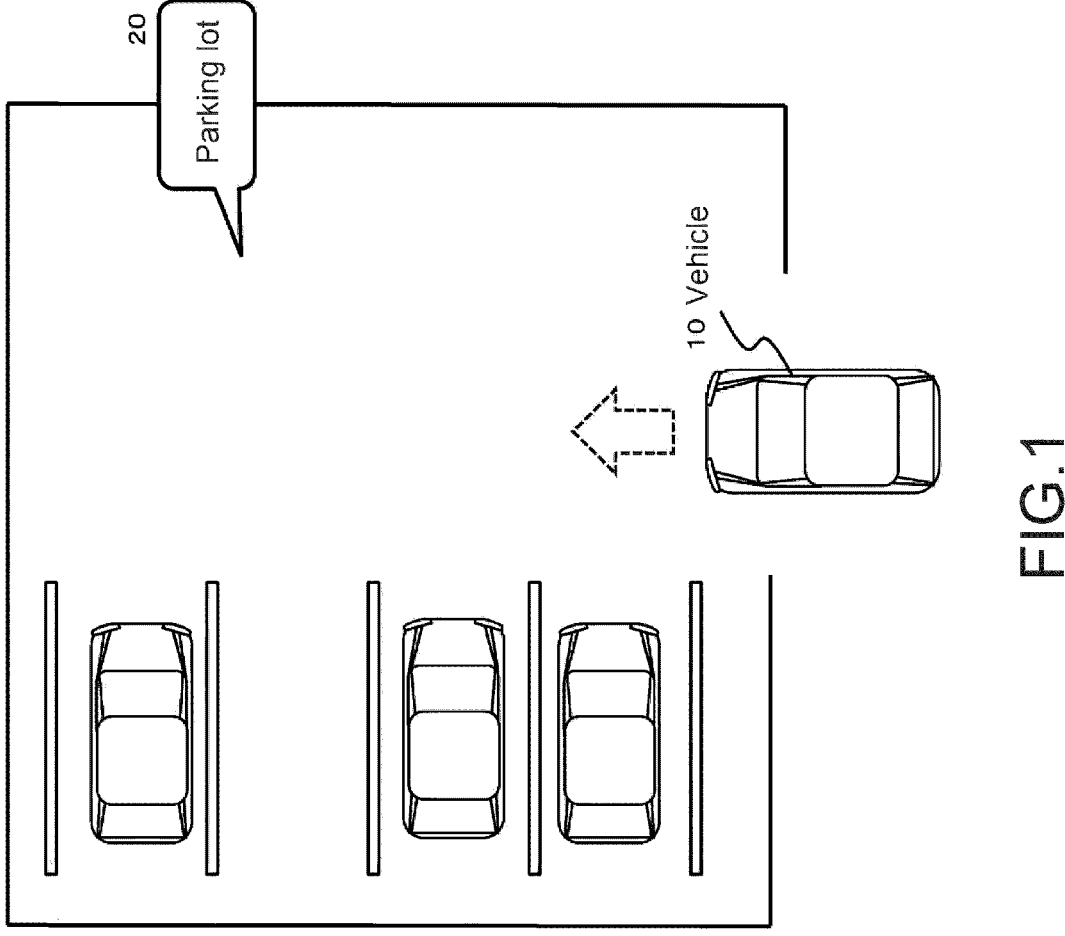
FIG. 1 is a diagram describing an example in which a vehicle to be parked in a parking lot runs.

Details of an information processing apparatus, an information processing method, and a program according an embodiment of the present disclosure will be described below with reference to the drawings. Note that the description will be made in accordance with the following items.

1. Regarding general processing of vehicle parking processing in parking lot and its problems
2. Regarding processing of present disclosure that simply presents parkable space and non-parkable space to user
3. Regarding variations of graphic data
4. Regarding sequence of processing executed by information processing apparatus according to embodiment of present disclosure
5. Regarding configuration example of information processing apparatus according to embodiment of present disclosure
6. Regarding hardware configuration example of information processing apparatus according to embodiment of present disclosure 7. Regarding configuration example of vehicle 8. Summary of configuration of present disclosure <1. Regarding General Processing of Vehicle Parking Processing in Parking Lot and its Problems>

First, general processing of vehicle parking processing in a parking lot and its problems will be described.

A general driving example in which a vehicle is parked in a parking lot will be described with reference to FIG. 1 and subsequent figures. FIG. 1 shows a vehicle 10 and a parking lot 20. The vehicle 10 enters the parking lot 20 from the entrance of the parking lot 20 and is trying to search for and park in an empty space.

In the situation shown in FIG. 1, a user who is a driver of the vehicle 10 enters the parking lot from the entrance of the parking lot 20 while looking ahead of the vehicle. At the time of entering, it is difficult to check which of parking division areas is empty.

Figure 2:
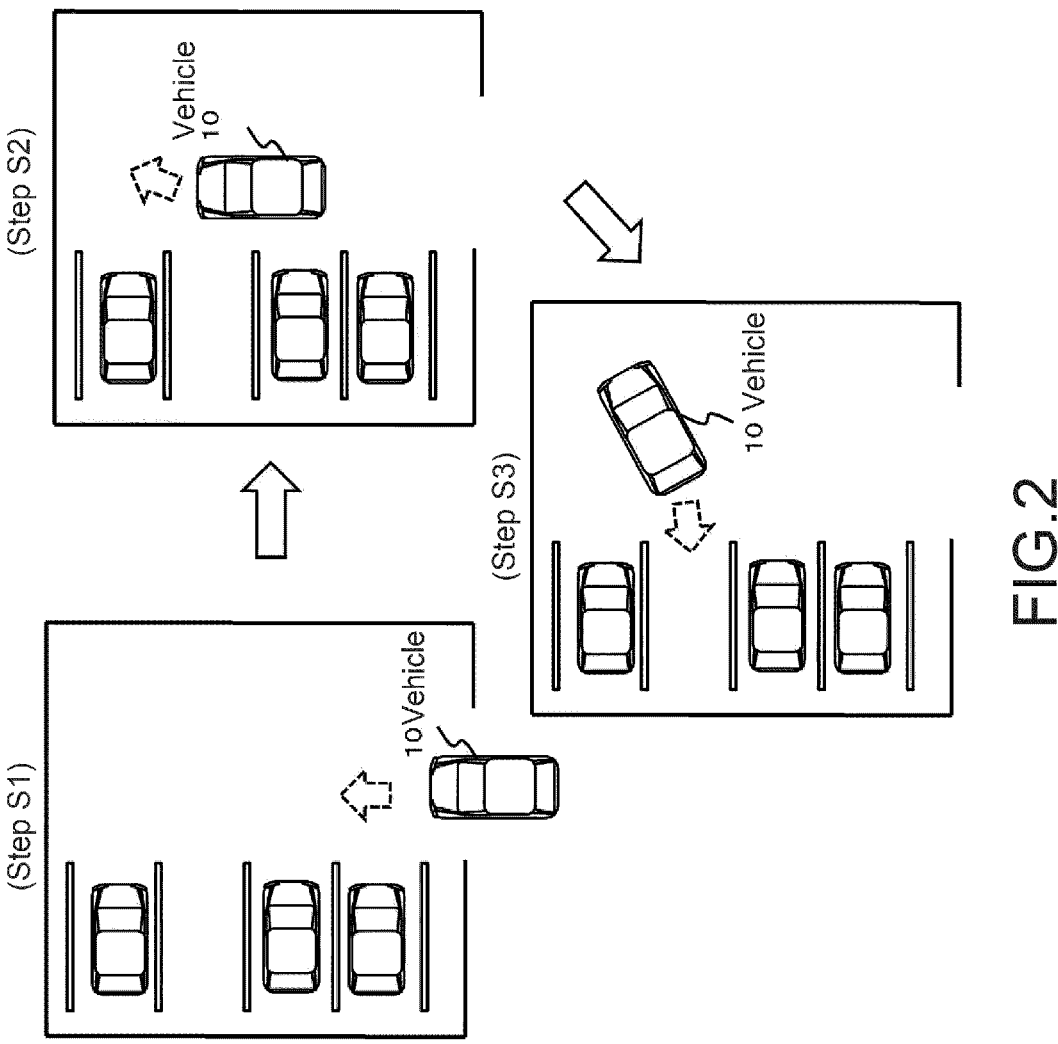
FIG. 2 is a diagram describing an example in which a vehicle to be parked in a parking lot runs.

For this reason, the user who is the driver of the vehicle 10 runs the vehicle 10 in the parking lot in the sequence as shown in FIG. 2, recognizes the empty space, and parks the vehicle.

First, in (Step S1) shown in FIG. 2, the vehicle 10 enters from the entrance of the parking lot 20. At this point, the user (driver) cannot check where is empty. In order to check where is empty, the user (driver) goes straight on the right side of the parking division areas on the left side as shown in (Step S2) and sequentially checks whether or not a vehicle is parked in the parking division area on the left side.

When the vehicle 10 goes straight and reaches the position shown in (Step S2), the user (driver) can visually recognize an empty space in which no vehicle is parked.

As a result, the user (driver) operates the steering wheel so as to park the vehicle in the empty space that can be visually recognized at the position shown in (Step S2). That is, as shown in (Step S3), the user (driver) performs a driving operation for causing the vehicle to proceed in the right front direction and then backing up the vehicle to park in the empty space.

Figure 3:
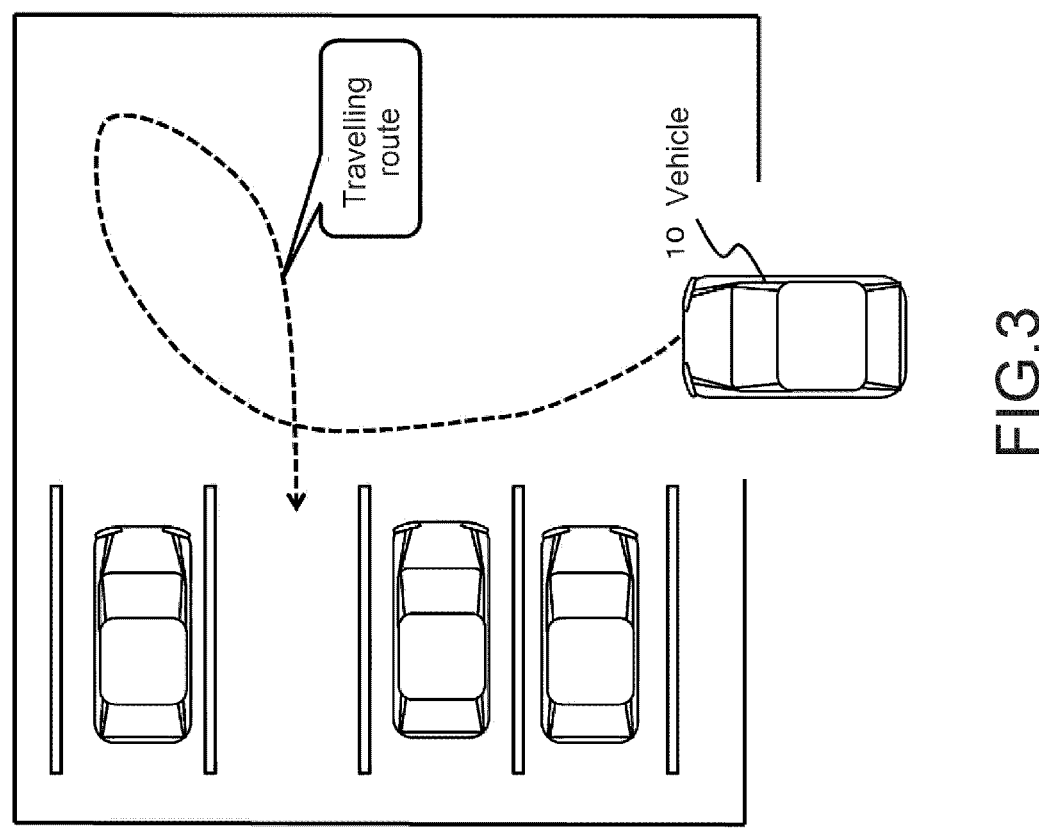
FIG. 3 is a diagram describing an example in which a vehicle to be parked in a parking lot runs.

The travelling route of the vehicle 10 in the series of processing is a travelling route as shown in FIG. 3. The vehicle 10 needs to travel in the parking lot in accordance with the travelling route as shown in FIG. 3 in order to check a parkable space and then park. It takes time to drive for checking an empty space and driving in a narrow parking lot is likely to cause contact accidents with other vehicles and people, which causes a security problem.

<2. Regarding Processing of Present Disclosure that Simply Presents Parkable Space and Non-Parkable Space to User>

Next, processing of the present disclosure that simply presents a parkable space and a non-parkable space to a user will be described.

Figure 4:
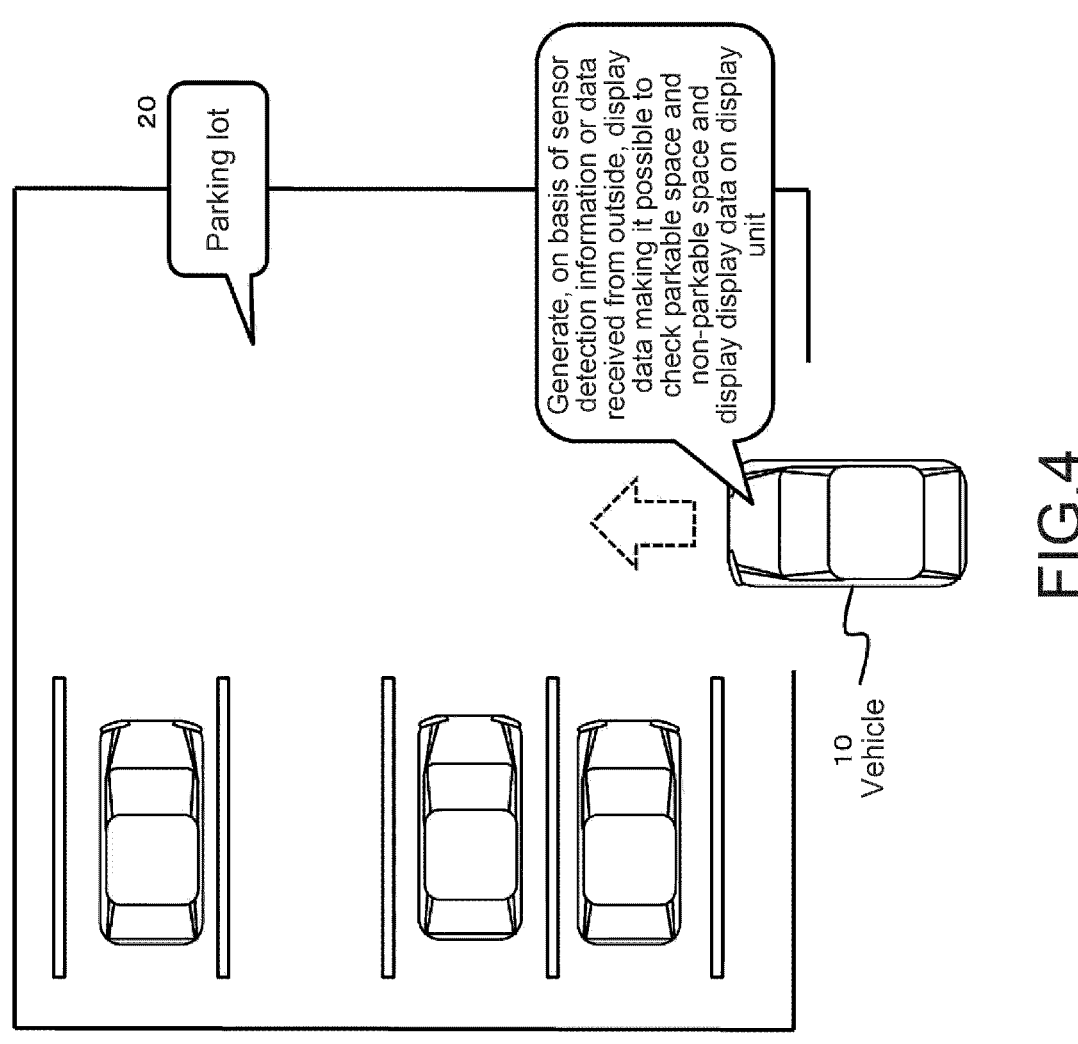
FIG. 4 is a diagram describing a processing example in which display data generated by an information processing apparatus according to an embodiment of the present disclosure is applied and the vehicle is parked in the parking lot.

FIG. 4 is a diagram similar to FIG. 1 described above. FIG. 4 shows the vehicle 10 and the parking lot 20, and the vehicle 10 enters the parking lot 20 from the entrance of the parking lot 20 and is trying to park in an empty space.

In the situation shown in FIG. 4, it is difficult for the user who is the driver of the vehicle 10 to visually check which of parking division areas is empty even when looking ahead of the vehicle. However, an information processing apparatus according to an embodiment of the present disclosure provided in the vehicle 10 analyzes, on the basis of detection information of a sensor mounted on the vehicle 10 or information received from an external apparatus such as a parking lot management server, whether each of the parking division areas in the parking lot 20 is parkable or non-parkable.

The sensor provided in the vehicle 10 is a sensor such as a camera sensor, a LiDAR (Light Detection and Ranging) sensor, and a ToF (Time of Flight) sensor. Note that the LiDAR (Light Detection and Ranging) sensor and the ToF sensor are each a sensor that outputs light such as laser light, analyzes reflected light from an object, and measures the distance from the surrounding object.

The information processing apparatus in the vehicle 10 uses such sensor detection information to analyze the situation around the vehicle and check the empty state of each parking division area of the parking lot 20.

Note that the information processing apparatus provided in the vehicle 10 does not necessarily need to use the sensor detection information described above, and may receive, for example, information regarding the empty state of each parking division area in the parking lot 20, i.e., whether each parking division area is parkable or non-parkable from an external apparatus such as a parking lot management server.

As described above, the information processing apparatus according to the embodiment of the present disclosure uses at least one of sensor detection information or information received from the outside to analyze whether each parking division area is parkable or non-parkable. Further, the information processing apparatus generates, on the basis of the result of this analysis processing, display data for simply presenting a parkable division area of a vehicle to a user who is a vehicle driver and displays the display data on a display unit. A specific example of the display data generated by the information processing apparatus according to the embodiment of the present disclosure will be described with reference to FIG. 5 and subsequent figures.

Figure 5:
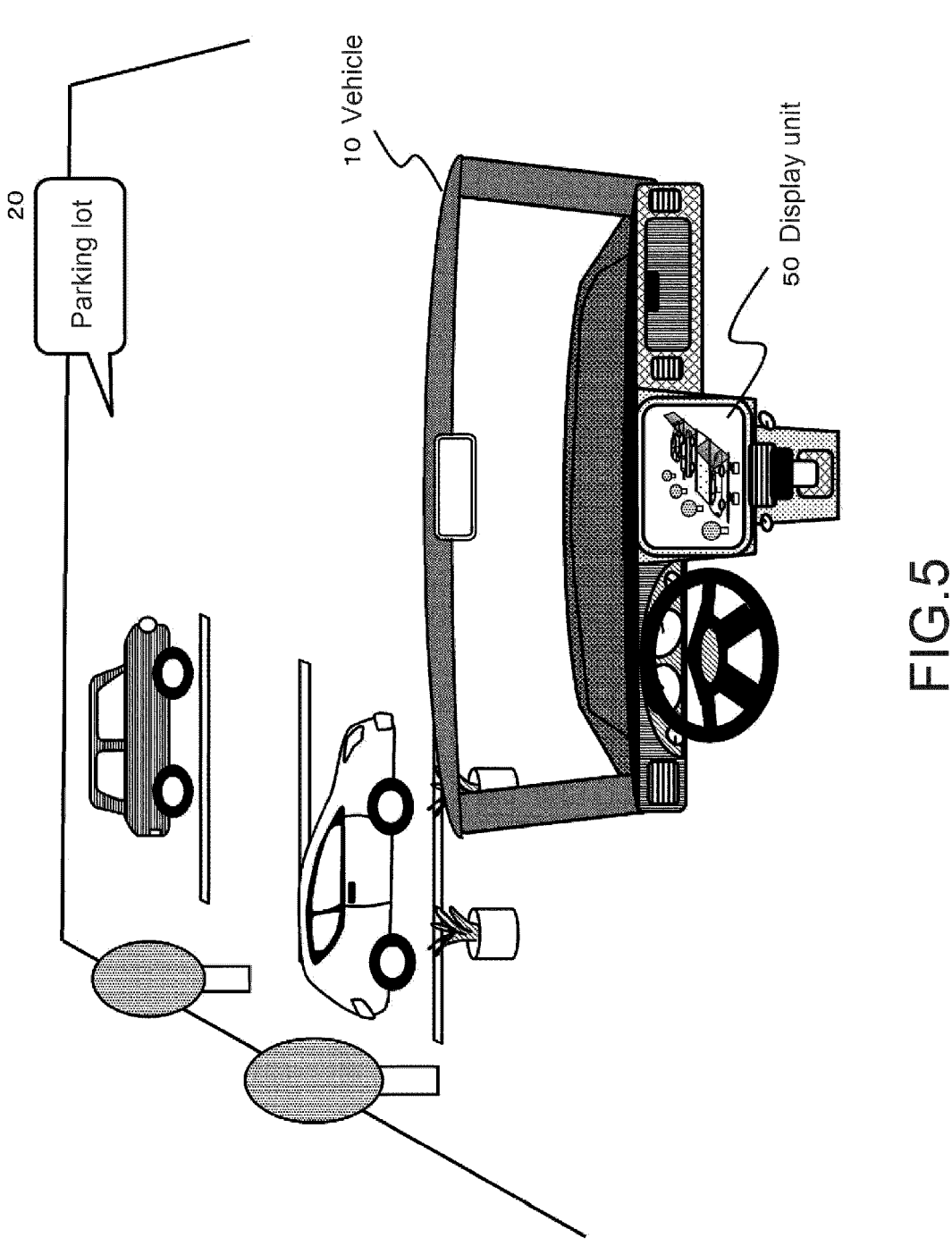
FIG. 5 is a diagram describing a specific example of the display data generated by the information processing apparatus according to the embodiment of the present disclosure.

FIG. 5 shows an example of a front panel of the vehicle 10 inside the vehicle 10. The display data generated by the information processing apparatus according to the embodiment of the present disclosure is displayed on a display unit 50 configured on the front panel of the vehicle 10. Note that the vehicle 10 shown in FIG. 5 corresponds to the vehicle 10 shown in FIG. 4 and is located at a position of entering the parking lot 20 from the entrance of the parking lot 20.

At this position, the information processing apparatus provided in the vehicle 10 has acquired information regarding whether each parking division area of the parking lot 20 is a parkable space or a non-parkable space, the information being generated on the basis of the sensor detection information or the information received from the outside.

The information processing apparatus uses this information to generate display data and displays the display data on the display unit, the display data making it possible to easily determine whether each parking division area of the parking lot 20 is parkable or non-parkable.

Figure 6:
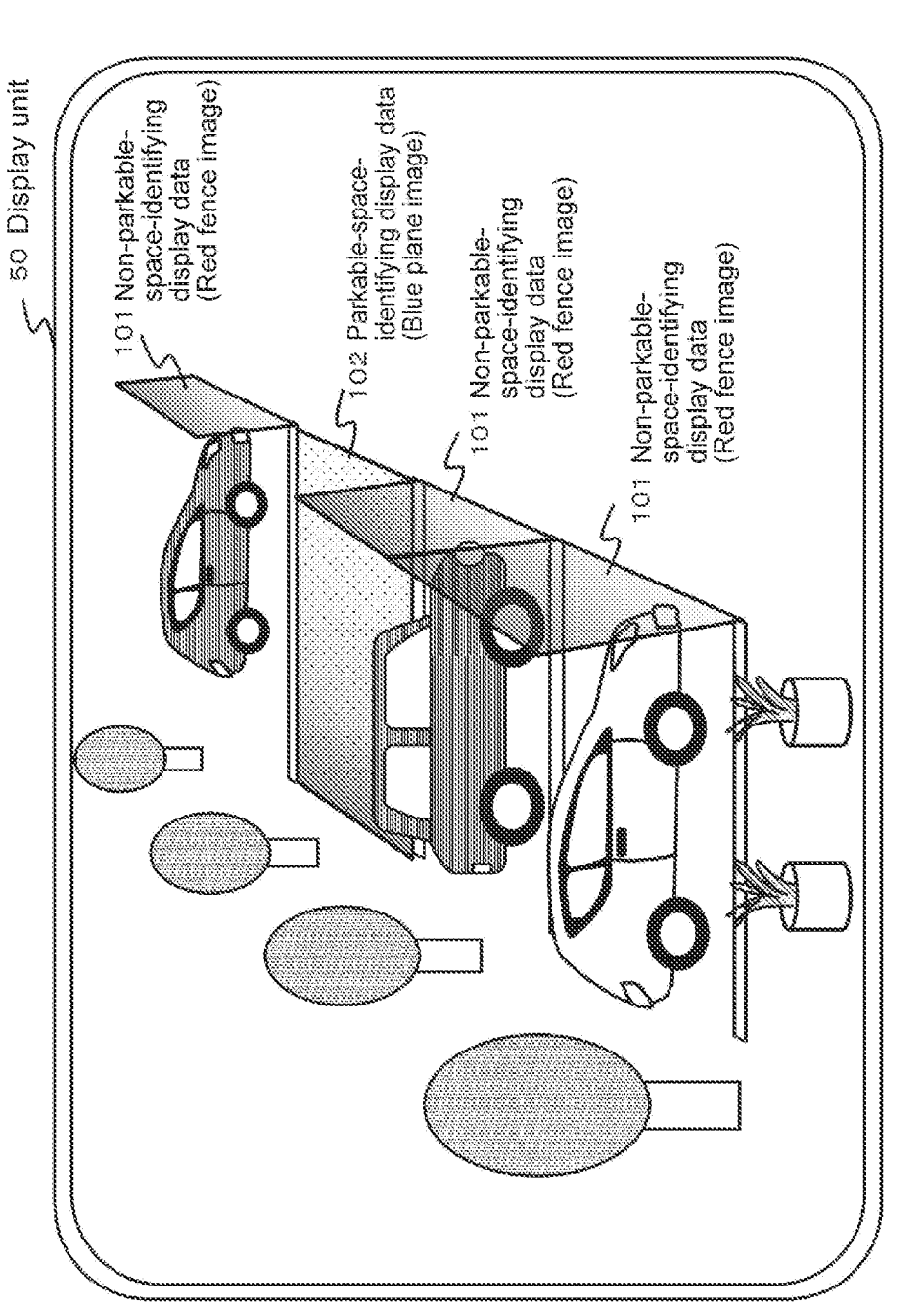
FIG. 6 is a diagram describing a specific example of the display data generated by the information processing apparatus according to the embodiment of the present disclosure.

FIG. 6 shows an example of the display data generated by the information processing apparatus according to the embodiment of the present disclosure. The display data shown in FIG. 6 shows an example of data displayed on the display unit 50 configured on the front panel of the vehicle 10.

The display data shown in FIG. 6 is display data displaying two types of graphic data (virtual objects) of non-parkable-space-identifying display data 101 and parkable-space-identifying display data 102 on an actual image taken by a camera provided in the vehicle 10.

Red fence-type display data having an upward extension surface extending upward from a vehicle contact surface, i.e., the non-parkable-space-identifying display data 101, is displayed for a non-parkable space in which a vehicle has been parked. Further, blue display data parallel to a vehicle contact surface, i.e., the parkable-space-identifying display data 102, is displayed for a parkable space in which no vehicle is parked.

The image of the parking lot is an actual image taken by the camera provided in the vehicle 10. The information processing apparatus provided in the vehicle 10 superimposes graphic data such as the non-parkable-space-identifying display data 101 and the parkable-space-identifying display data 102, which is a virtual object, on the actual image and displays the obtained image. That is, the information processing apparatus of the vehicle 10 generates an AR (Augmented Reality) image that is an augmented reality image in which a real object and a virtual object are mixed, and displays the generated image on the display unit 50.

The red fence-type non-parkable-space-identifying display data 101 shown in FIG. 6 has higher transparency toward the lower side (vehicle contact surface side) and lower transparency toward the upper side. That is, the red fence-type non-parkable-space-identifying display data 101 is red translucent fence-type three-dimensional graphic data (virtual object) having a setting that the red color becomes clearer toward the upper side.

This non-parkable-space-identifying display data 101 is displayed so as to stand substantially upright at a position in front of a parking division determined as a vehicle non-parkable space because a vehicle has been present in the parking division area of the parking lot.

Meanwhile, the blue plain-type parkable-space-identifying display data 102 shown in FIG. 6 is plain-type graphic data (virtual object) has higher transparency toward the front side of the parking area (parking entrance/exit side) and lower transparency toward the rear side of the parking area. That is, the blue plain-type parkable-space-identifying display data 102 is plain-type graphic data (virtual object) having a setting that the blue color becomes clearer toward the rear side of the parking area.

Note that these two types of graphic data, i.e., the red fence-type non-parkable-space-identifying display data 101 and the blue plain-type parkable-space-identifying display data 102, are displayed so as to be arranged on the front line of the parking division area, i.e., the front line of the parking division area that is the entrance when a vehicle is parked.

The user (driver) who tries to enter the parking lot 20 and park the vehicle 10 can easily and reliably determine that the area in which the red fence-type non-parkable-space-identifying display data 101 is displayed is a non-parkable space and the area in which the blue plain-type parkable-space-identifying display data 102 is displayed is a parkable space by looking at the graphic data of the display data displayed on the display unit 50 of the vehicle 10.

The user (driver) can efficiently park, on the basis of the determination result, the vehicle 10 in the area in which the blue plain-type parkable-space-identifying display data 102 is displayed.

The red fence-type non-parkable-space-identifying display data 101 is an object that is unlikely to be present in a real parking lot, and the driver can immediately and reliably identify a non-parkable area by looking at the red fence that is displayed on the display unit 50 and is unlikely to be present.

Note that the red fence-type non-parkable-space-identifying display data 101 is translucent graphic data as described above, and thus, the actual image and the graphic data on the back side hidden by the displayed red fence can be recognized. For example, the blue plain-type parkable-space-identifying display data 102 is displayed for the third parking division from the front in FIG. 6 and part of the blue plain-type parkable-space-identifying display data 102 overlaps with the red fence-type non-parkable-space-identifying display data 101 in front thereof. The red fence-type non-parkable-space-identifying display data 101 in front thereof has transparency, and thus, the blue plain-type graphic data therebehind can be recognized via the red fence.

As described above, the information processing apparatus according to the embodiment of the present disclosure generates display data that does not obstruct the view of the user (driver or occupant) and displays the display data, an upright fence with respect to a vehicle contact surface having transparency in the display data. The user (driver or occupant) can immediately recognize the presence of a parkable space by looking at, via the red fence, the blue plain-type parkable-space-identifying display data 102 behind the red fence. Further, the red fence-type non-parkable-space-identifying display data 101 has higher transparency toward the lower side (vehicle contact surface side) and lower transparency toward the upper side. This configuration makes it possible for the user (driver or occupant) to easily recognize even a non-parkable space far from the vehicle 10.

Next, details of the red fence-type non-parkable-space-identifying display data 101 and the blue plain-type parkable-space-identifying display data 102 that are pieces of graphic data (virtual objects) generated as display data by the information processing apparatus according to the embodiment of the present disclosure will be described with reference to FIG. 7.

Figure 7:
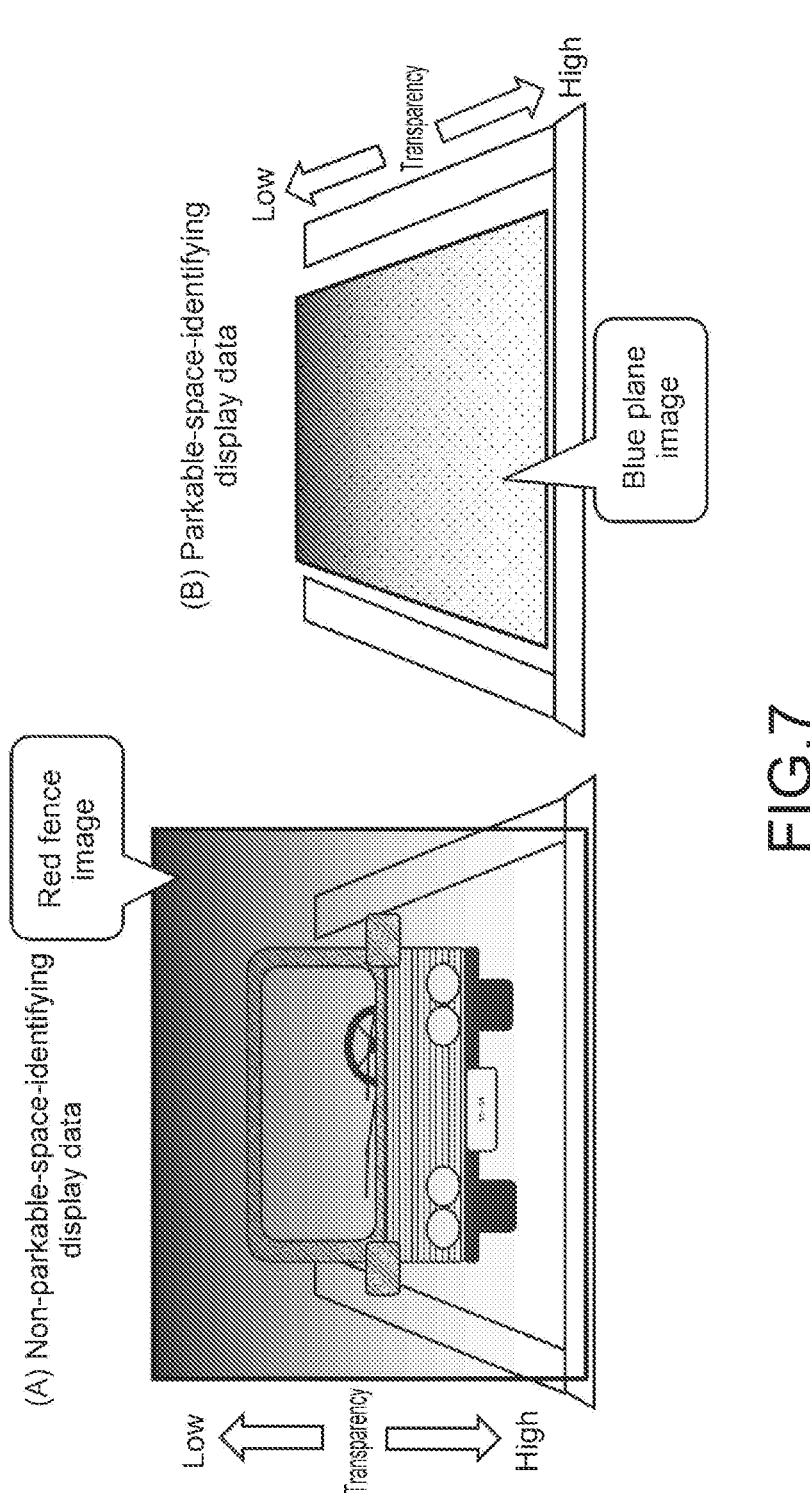
FIG. 7 is a diagram describing a specific example of the display data generated by the information processing apparatus according to the embodiment of the present disclosure.

FIG. 7 shows the following two pieces of graphic data: (A) non-parkable-space-identifying display data; and (B) parkable-space-identifying display data. Both of the pieces of graphic data show the state seen from the front of the corresponding parking division.

The (A) non-parkable-space-identifying display data is fence-type display data standing in front of the parking division and is three-dimensional graphic data having a red fence shape that stands perpendicular to the vehicle traveling surface. As shown in FIG. 7, the red fence-type non-parkable-space-identifying display data has higher transparency toward the lower side (vehicle contact surface side) and lower transparency toward the upper side. That is, the red fence-type non-parkable-space-identifying display data is red translucent fence-type three-dimensional graphic data (virtual object) having a setting that the red color becomes clearer toward the upper side.

Meanwhile, the (B) parkable-space-identifying display data has higher transparency toward the front side of the parking area (parking entrance/exit side) and lower transparency toward the rear side of the parking area. That is, the (B) parkable-space-identifying display data is plain-type graphic data (virtual object) having a setting that the blue color becomes clearer toward the front side of the parking area. As shown in FIG. 7, the blue plain-type parkable-space-identifying display data is blue plain-type graphic data (virtual object) spreading on the contact surface that is a parking plane.

Figure 8:
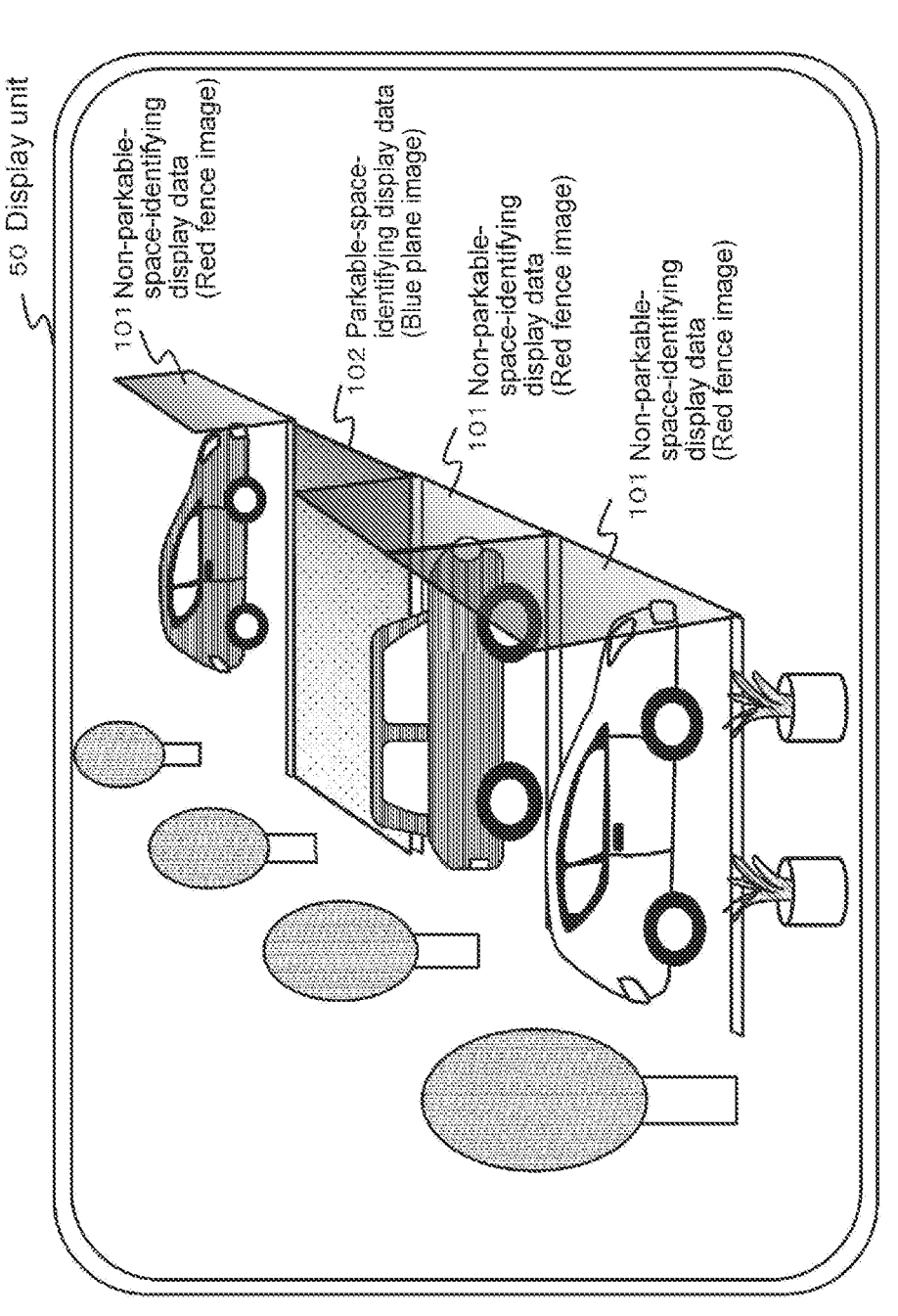
FIG. 8 is a diagram describing a specific example of the display data generated by the information processing apparatus according to the embodiment of the present disclosure.

FIG. 8 shows an example in which the setting of the transparency of the blue plain-type parkable-space-identifying display data 102 described with reference to FIG. 6 and FIG. 7 is reversed. The red fence-type non-parkable-space-identifying display data 101 is the same data as that described above with reference to FIG. 6 and FIG. 7, and has higher transparency toward the lower side (vehicle contact surface side) and lower transparency toward the upper side. That is, the red fence-type non-parkable-space-identifying display data 101 is red translucent fence-type three-dimensional graphic data (virtual object) having a setting that the red color becomes clearer toward the upper side.

This non-parkable-space-identifying display data 101 is displayed so as to stand substantially upright at a position in front of a parking division determined as a vehicle non-parkable space because a vehicle has been present in the parking division area of the parking lot.

Meanwhile, the blue plain-type parkable-space-identifying display data 102 shown in FIG. 2 is set such that the transparency is lower and the blue output is larger toward the front side of the parking area (parking entrance/exit side) and the transparency is higher and the blue output is smaller toward the rear side of the parking area. That is, the blue plain-type parkable-space-identifying display data 102 is plain-type graphic data (virtual object) having a setting that the blue color becomes clearer toward the front side of the parking area.

With such setting, for example, even in the case where a vehicle is present in front of the blue plain-type parkable-space-identifying display data 102 and the red fence-type non-parkable-space-identifying display data 101 is displayed at the position, the blue color in front of the blue plain-type parkable-space-identifying display data 102 therebehind can be easily recognized. For this reason, for example, it is unnecessary to perform processing on the occlusion area, such as generating and displaying an image of a portion hidden by the red fence-type non-parkable-space-identifying display data 101.

Note that these two types of graphic data, i.e., the red fence-type non-parkable-space-identifying display data 101 and the blue plain-type parkable-space-identifying display data 102 are displayed so as to be arranged on the front line of the parking division area, i.e., the front line of the parking division area that is the entrance when a vehicle is parked.

The user (driver) who tries to enter the parking lot 20 and park the vehicle 10 can easily and reliably determine that the area in which the red fence-type non-parkable-space-identifying display data 101 is displayed is a non-parkable space and the area in which the blue plain-type parkable-space-identifying display data 102 is displayed is a parkable space by looking at the graphic data of the display data displayed on the display unit 50 of the vehicle 10.

The user (driver) can efficiently park, on the basis of the determination result, the vehicle 10 in the area in which the blue plain-type parkable-space-identifying display data 102 is displayed.

Figure 9:
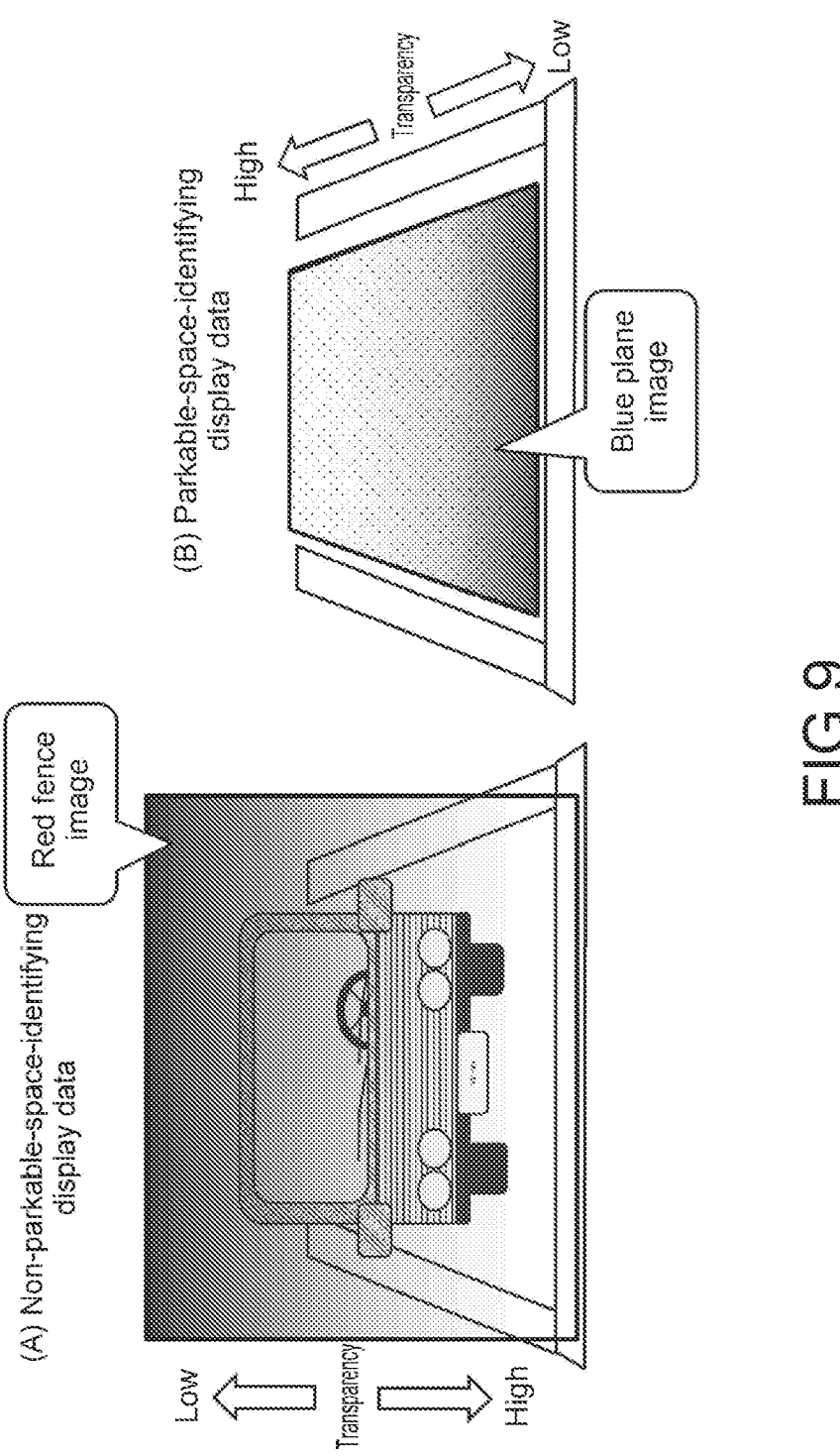
FIG. 9 is a diagram describing a specific example of the display data generated by the information processing apparatus according to the embodiment of the present disclosure.

FIG. 9 is a diagram describing details of the red fence-type non-parkable-space-identifying display data 101 and the blue plain-type parkable-space-identifying display data 102 shown in FIG. 8.

FIG. 9 shows the following two pieces of graphic data: (A) non-parkable-space-identifying display data; and (B) parkable-space-identifying display data. Both of the pieces of graphic data show the state seen from the front of the corresponding parking division.

The (A) non-parkable-space-identifying display data is the same data as that described above with reference to FIG. 7, is fence-type display data standing in front of the parking division, and is three-dimensional graphic data having a red fence shape that stands perpendicular to the vehicle traveling surface. As shown in FIG. 9, the red fence-type non-parkable-space-identifying display data has higher transparency toward the lower side (vehicle contact surface side) and lower transparency toward the upper side. That is, the red fence-type non-parkable-space-identifying display data is red translucent fence-type three-dimensional graphic data (virtual object) having a setting that the red color becomes clearer toward the upper side.

Meanwhile, the (B) parkable-space-identifying display data shows the details of the blue plain-type parkable-space-identifying display data 102, and has setting that the transparency is lower and the blue output is larger toward the front side of the parking area (parking entrance/exit side) and the transparency is higher and the blue output is smaller toward the rear side of the parking area. That is, the (B) parkable-space-identifying display data is plain-type graphic data (virtual object) having a setting that the blue color becomes clearer toward the front of the parking area.

Note that although an example in which the non-parkable-space-identifying display data 101 is a red translucent upright fence and the parkable-space-identifying display data 102 is a blue translucent plane has been described in this Example, various settings can be made for the color, shape, and transparence of the graphic data. Further, graphic data to which a pattern or texture is added may be used. Various setting examples will be described below.

<3. Regarding Variations of Graphic Data>

Next, variations of graphic data displayed as the non-parkable-space-identifying display data 101 or the parkable-space-identifying display data 102 will be described.

In the Example described with reference to FIG. 6 and FIG. 7, the non-parkable-space-identifying display data 101 is graphic data that has an upward extension surface extending upward from a vehicle contact surface in front of the parking division and a red translucent upright fence shape, and is graphic data (virtual object) having a setting that the transparency is higher toward the lower side (vehicle contact surface side) and the transparency is lower toward the upper side. Meanwhile, the parkable-space-identifying display data 102 is blue plain-type graphic data (virtual object) spreading on the contact surface that is a parking plane.

Figure 10:
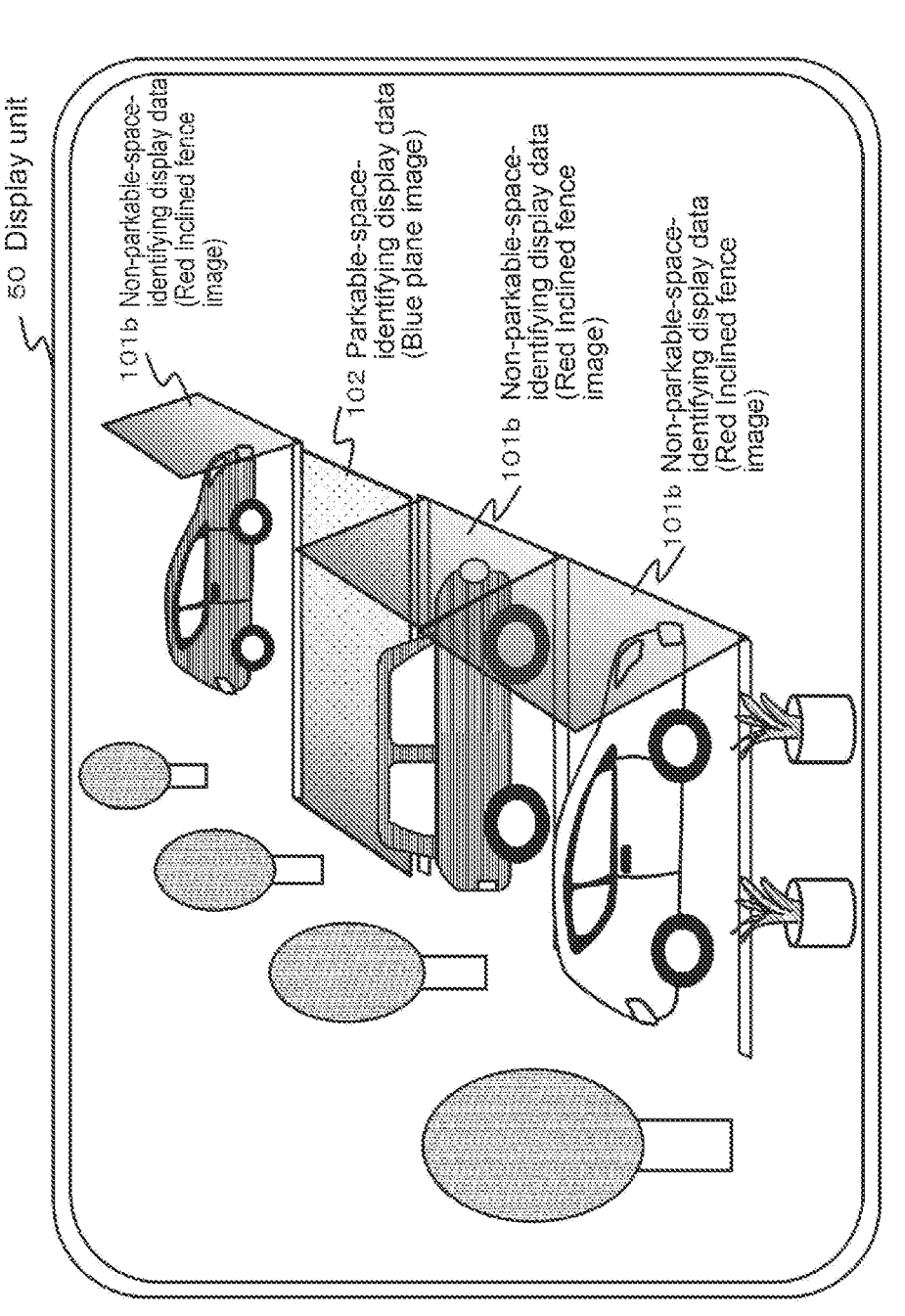
FIG. 10 is a diagram describing a specific example of the display data generated by the information processing apparatus according to the embodiment of the present disclosure.

Variations of graphic data having a setting different from the settings described above will be described. FIG. 10 is a diagram showing an example of the data displayed on the display unit 50 configured on the front panel of the vehicle 10, similarly to FIG. 6 described above.

The display data shown in FIG. 10 is display data displaying two types of graphic data (virtual objects) on the actual image taken by the camera provided in the vehicle 10 similarly to that in FIG. 6 described above, the two types of graphic data being non-parkable-space-identifying display data 101*b* and the parkable-space-identifying display data 102.

Red fence-type display data extending diagonally upward from the vehicle contact surface, i.e., the non-parkable-space-identifying display data 101*b*, is displayed for a non-parkable space in which a vehicle has been parked. Further, blue display data parallel to the vehicle contact surface, i.e., the parkable-space-identifying display data 102, is displayed for a parkable space in which no vehicle is parked.

The red fence-type non-parkable-space-identifying display data 101 described above in FIG. 6 has a fence shape extending upward perpendicular to the contact surface, but the red fence-type non-parkable-space-identifying display data 101*b* shown in FIG. 10 has a fence shape extending diagonally upward from the contact surface. In this respect, the red fence-type non-parkable-space-identifying display data 101*b* shown in FIG. 10 is different from the red fence-type non-parkable-space-identifying display data 101 shown in FIG. 6.

Note that the setting of the transparency of the red fence-type non-parkable-space-identifying display data 101*b* shown in FIG. 10 is a setting that the transparency is higher toward the lower side (vehicle contact surface side) and the transparency is lower toward the upper side. That is, the red fence-type non-parkable-space-identifying display data 101*b* is red translucent fence-type three-dimensional graphic data (virtual object) having a setting that the red color becomes clearer toward the upper side.

This non-parkable-space-identifying display data 101*b* is displayed so as to stand at an angle in front of a parking division determined as a vehicle non-parkable space because a vehicle has been present in the parking division area of the parking lot.

Meanwhile, the blue plain-type parkable-space-identifying display data 102 shown in FIG. 10 has higher transparency toward the front side of the parking area (parking entrance/exit side) and lower transparency toward the rear side of the parking area. That is, the blue plain-type parkable-space-identifying display data 102 is plain-type graphic data (virtual object) having a setting that the blue color becomes clearer toward the rear side of the parking area. This is graphic data similar to the parkable-space-identifying display data 102 described above with reference to FIG. 6.

Note that these two types of graphic data, i.e., the red fence-type non-parkable-space-identifying display data 101*b* and the blue plain-type parkable-space-identifying display data 102 are displayed so as to be arranged on the front line of the parking division area, i.e., the front line of the parking division area that is the entrance when a vehicle is parked.

Figure 11:
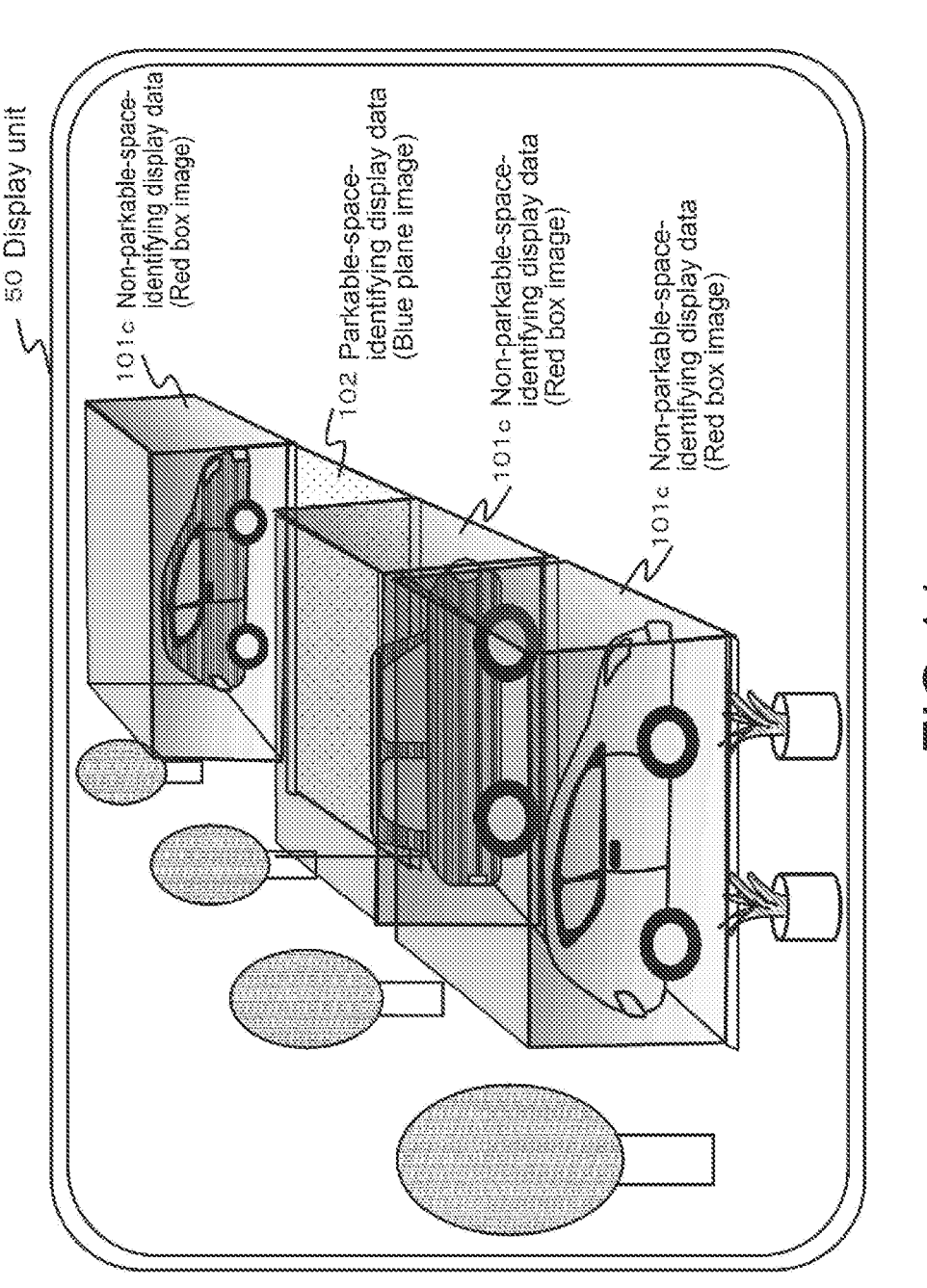
FIG. 11 is a diagram describing a specific example of the display data generated by the information processing apparatus according to the embodiment of the present disclosure.

Further, a modified example of graphic data will be described with reference to FIG. 11. FIG. 11 is a diagram showing an example of the data displayed on the display unit 50 configured on the front panel of the vehicle 10, similarly to FIG. 6 described above.

Also the display data shown in FIG. 11 is display data displaying two types of graphic data (virtual objects) on the actual image taken by the camera provided in the vehicle 10 similarly to that in FIG. 6 described above, the two types of graphic data being non-parkable-space-identifying display data 101*c* and the parkable-space-identifying display data 102.

Red box-type display data is displayed as the non-parkable-space-identifying display data 101*c* for a non-parkable space in which a vehicle has been parked. The non-parkable-space-identifying display data 101*c* displaying the red box-type display data is red box-type display data having an upward extension surface extending upward from a vehicle contact surface. Further, blue display data parallel to a vehicle contact surface, i.e., the parkable-space-identifying display data 102, is displayed for a parkable space in which no vehicle is parked.

The non-parkable-space-identifying display data 101*c* shown in FIG. 11 has not the fence-type shape described with reference to FIG. 6 and FIG. 10 but a box-type shape having a shape incorporating the entire parked vehicle.

Note that the transparency setting of the red box-type non-parkable-space-identifying display data 101*c* shown in FIG. 11 is setting that the transparency is higher toward the lower side (vehicle contact surface side) and the transparency is lower toward the upper side. That is, the red box-type non-parkable-space-identifying display data 101*c* is red translucent box-type three-dimensional graphic data (virtual object) having a setting that the red color becomes clearer toward the upper side.

This non-parkable-space-identifying display data 101*c* is displayed as a box including the entire parking division determined as a vehicle non-parkable space because a vehicle has been present in the parking division area of the parking lot.

Meanwhile, the blue plain-type parkable-space-identifying display data 102 shown in FIG. 11 has higher transparency toward the front side of the parking area (parking entrance/exit side) and lower transparency toward the rear side of the parking area. That is, the blue plain-type parkable-space-identifying display data 102 is plain-type graphic data (virtual object) having a setting that the blue color becomes clearer toward the rear side of the parking area. This is graphic data similar to the parkable-space-identifying display data 102 described above with reference to FIG. 6.

Note that these two types of graphic data, i.e., the red box-type non-parkable-space-identifying display data 101*c* and the blue plain-type parkable-space-identifying display data 102, are displayed so as to be arranged on the front line of the parking division area, i.e., the front line of the parking division area that is the entrance when a vehicle is parked.

An example of graphic data that can be used as non-parkable-space-identifying display data or parkable-space-identifying display data will be described with reference to FIG. 12 and subsequent figures.

Figure 12:
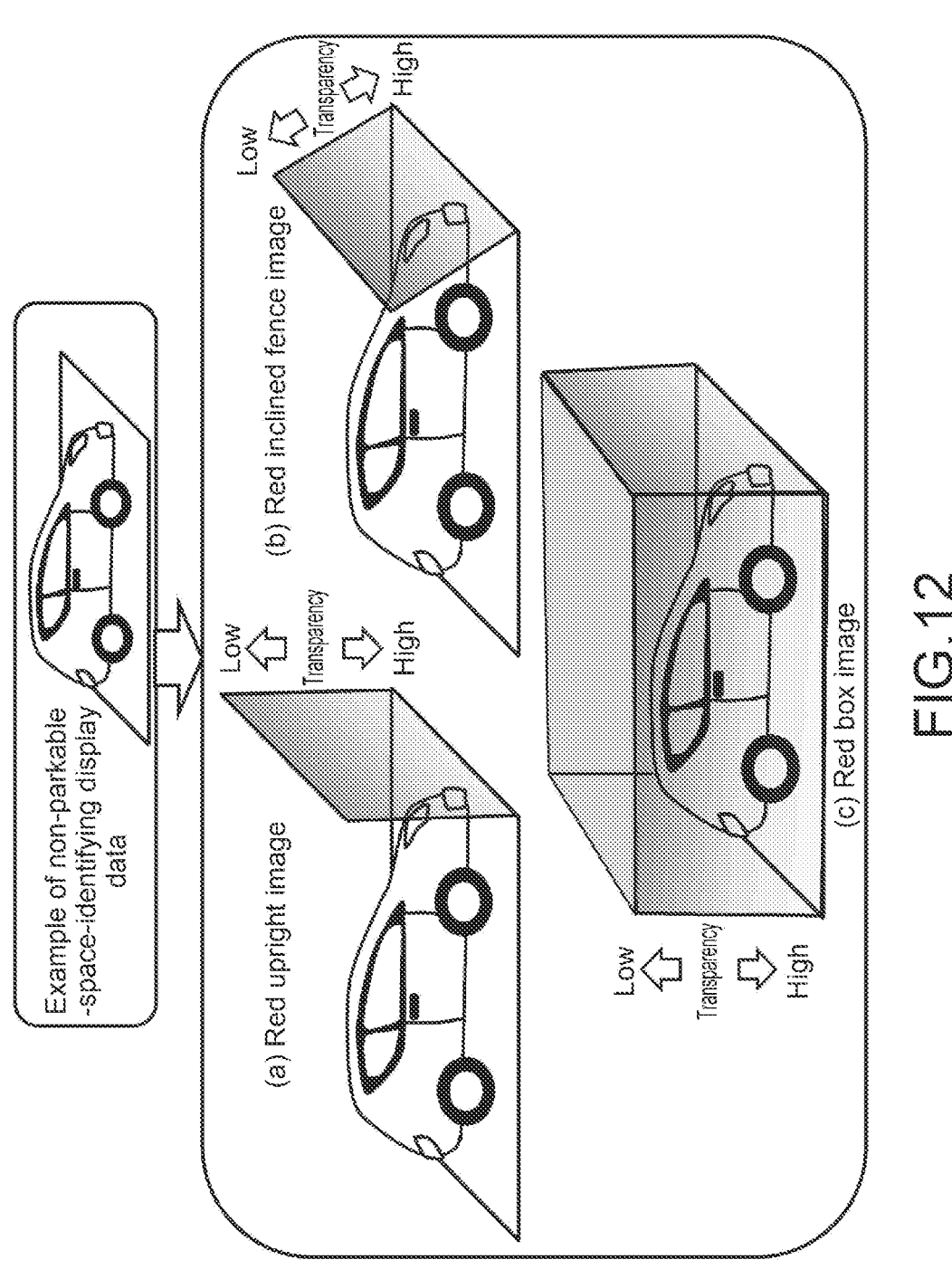
FIG. 12 is a diagram describing a specific example of the display data generated by the information processing apparatus according to the embodiment of the present disclosure.

FIG. 12 is a diagram collectively describing three types of the non-parkable-space-identifying display data 101 described with reference to FIG. 6, FIG. 10, and FIG. 11. The following three types of images (graphic data) are shown: (a) a red upright fence image; (b) a red inclined fence image; and (c) the red box image. For example, as the non-parkable-space-identifying display data 101, one of these three types of images can be used.

Note that the transparency is set such that the transparency is higher toward the contact surface side and the transparency is lower toward the upper side of the contact surface for each of the (a) to (c) images. That is, the red color is output more strongly toward the upper side of the contact surface. Note that although the red color is set in this example, this is just an example and another color may be set. Further, graphic data to which a pattern or texture is added may be used.

Figure 13:
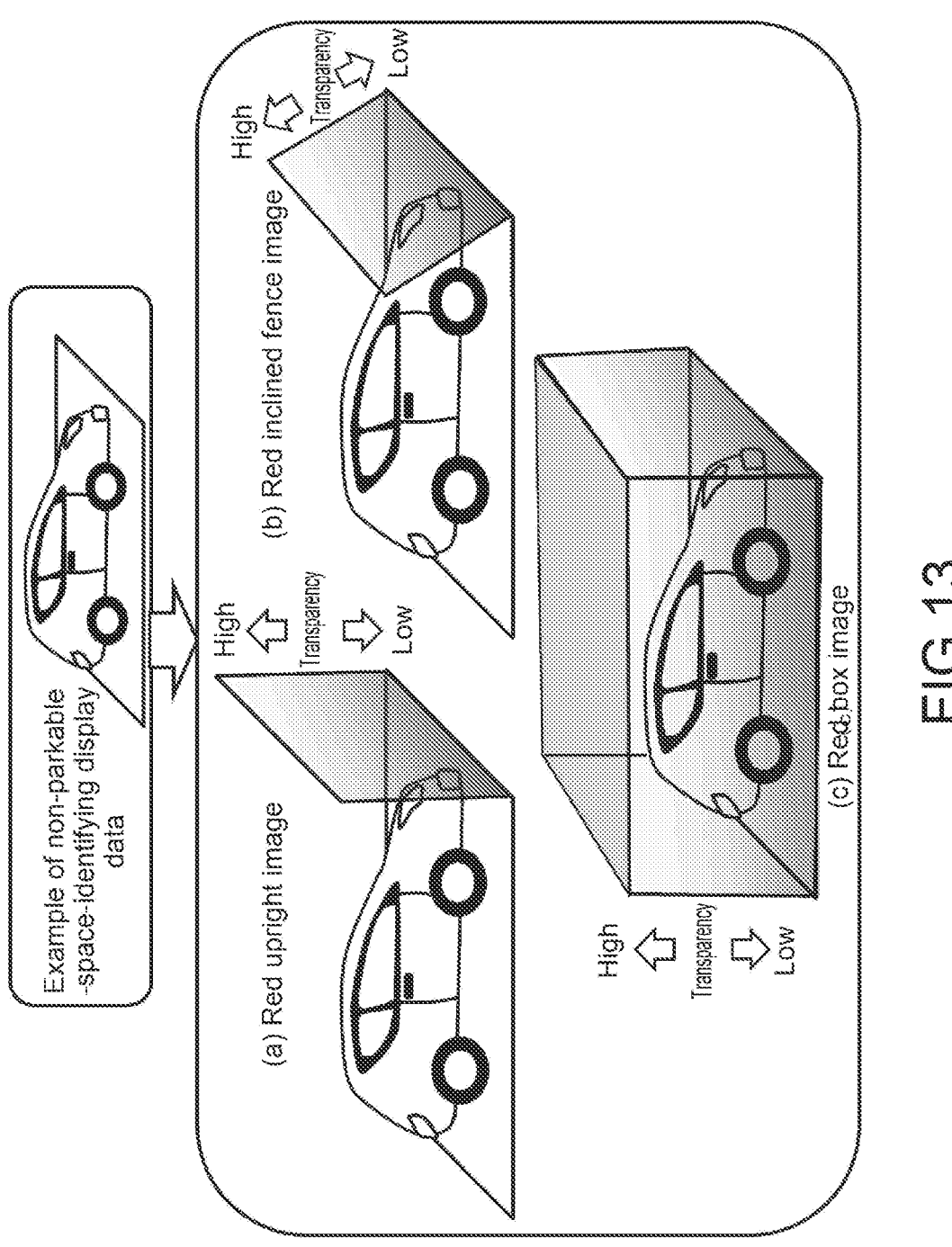
FIG. 13 is a diagram describing a specific example of the display data generated by the information processing apparatus according to the embodiment of the present disclosure.

FIG. 13 is a diagram showing an example of the non-parkable-space-identifying display data 101 different from that in FIG. 12. The following three types of images (graphic data) are shown: (a) a red upright fence image; (b) a red inclined fence image; and (c) a red box image.

The graphic data of the three pieces of non-parkable-space-identifying display data 101 shown in FIG. 13 is graphic data in which the setting of the transparency is reversed from that in the example shown in FIG. 12. That is, the transparency is set such that the transparency is lower toward the contact surface side and the transparency is higher toward the upper side of the contact surface for each of the (a) to (c) images. That is, the red color is output more strongly toward the contact surface. Note that although the red color is set in this example, this is just an example and another color may be set. Further, graphic data to which a pattern or texture is added may be used.

Figure 14:
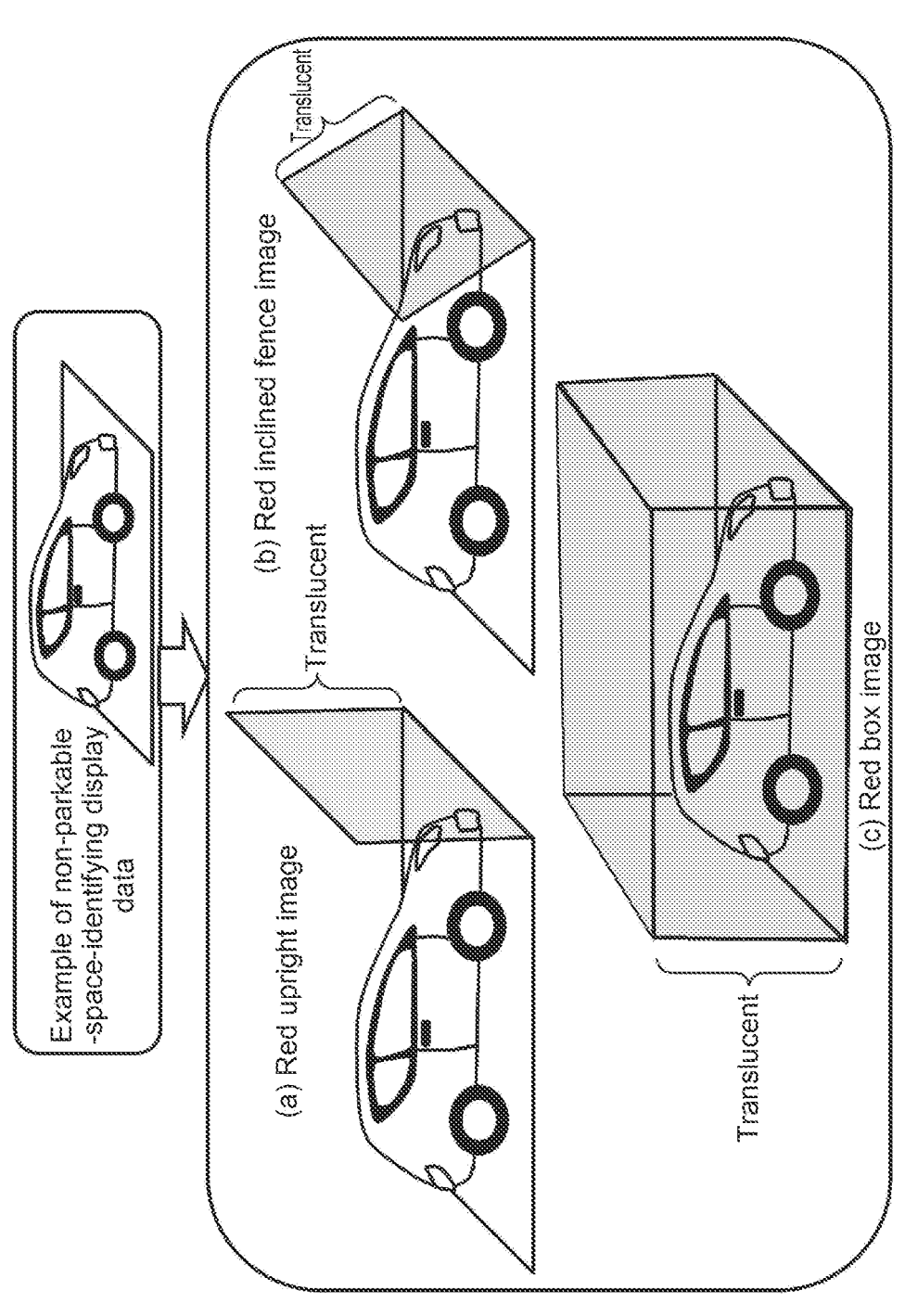
FIG. 14 is a diagram describing a specific example of the display data generated by the information processing apparatus according to the embodiment of the present disclosure.

FIG. 14 is a diagram showing still another example of the non-parkable-space-identifying display data 101. The following three types of images (graphic data) are shown: (a) a red upright fence image; (b) a red inclined fence image; and (c) a red box image.

The graphic data of the three pieces of non-parkable-space-identifying display data 101 shown in FIG. 14 is graphic data in which the transparency is set to be uniform in the entire fence or the entire box. That is, the transparency is set so as to be uniform from the contact surface to the upper side for each of the (a) to (c) images. Also the red color is output uniformly. Note that although the red color is set in this example, this is just an example and another color may be set. Further, graphic data to which a pattern or texture is added may be used.

Figure 15:
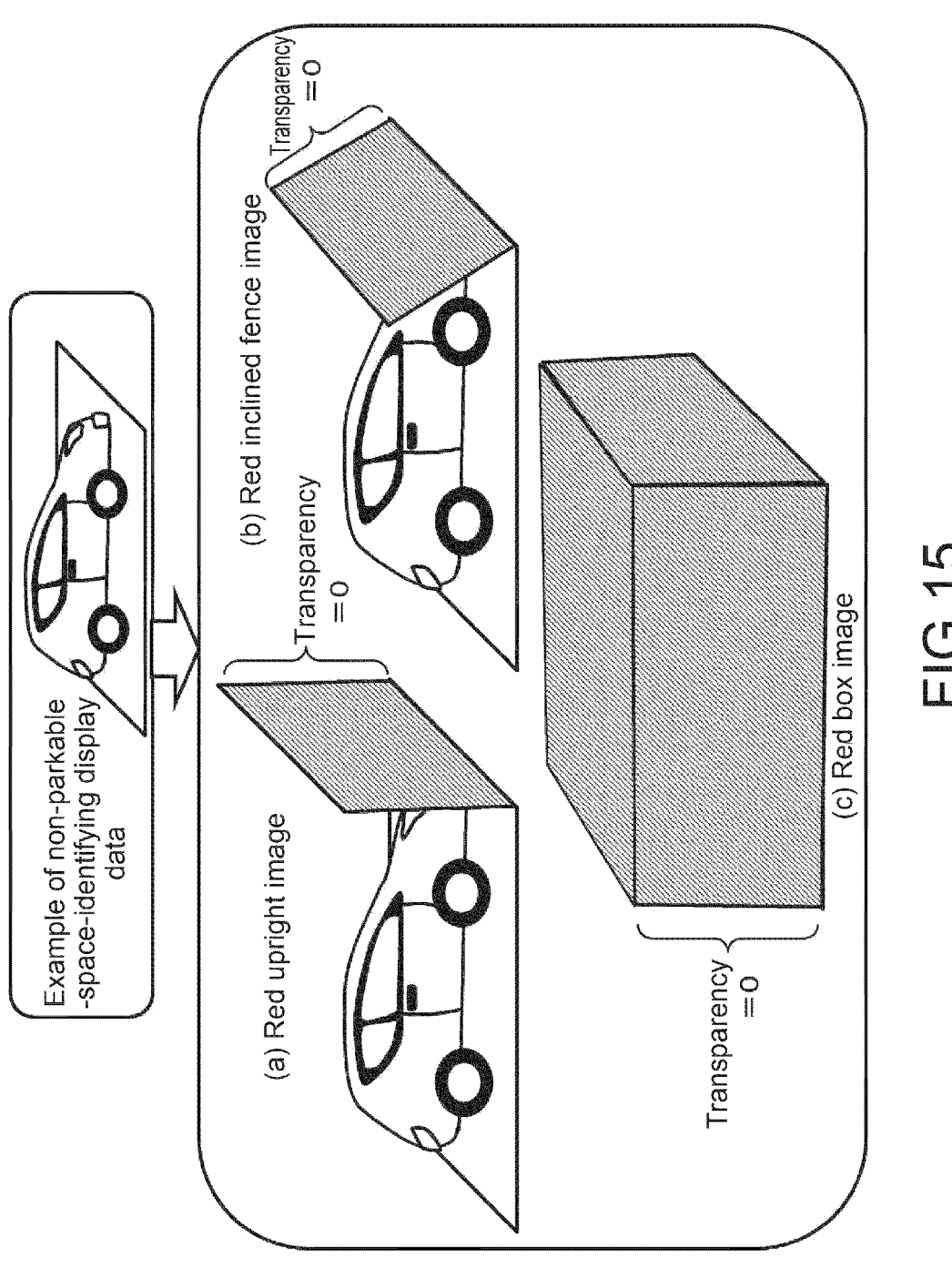
FIG. 15 is a diagram describing a specific example of the display data generated by the information processing apparatus according to the embodiment of the present disclosure.

FIG. 15 is a diagram showing still another example of the non-parkable-space-identifying display data 101. The following three types of images (graphic data) are shown: (a) a red upright fence image; (b) a red inclined fence image; and (c) a red box image.

The graphic data of the three pieces of non-parkable-space-identifying display data 101 shown in FIG. 15 is graphic data in which the transparency is set to be zero, i.e., the entire fence or the entire box is set to be opaque. That is, the opaque red color is output from the contact surface to the upper side for each of the (a) to (c) images. Note that although the red color is set in this example, this is just an example and another color may be set. Further, graphic data to which a pattern or texture is added may be used.

Figure 16:
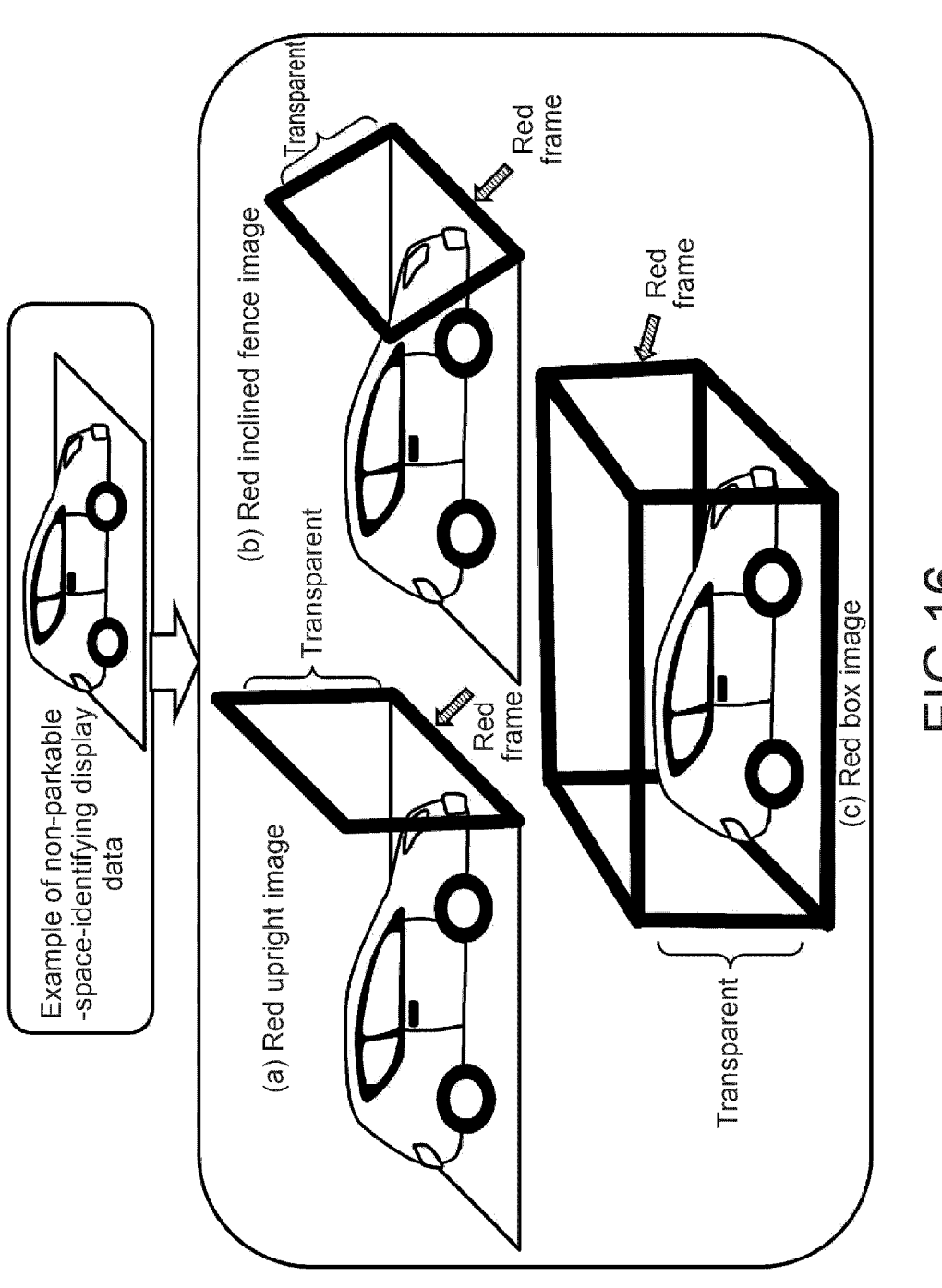
FIG. 16 is a diagram describing a specific example of the display data generated by the information processing apparatus according to the embodiment of the present disclosure.

FIG. 16 is a diagram showing still another example of the non-parkable-space-identifying display data 101. The following three types of images (graphic data) are shown: (a) a red upright fence image; (b) a red inclined fence image; and (c) a red box image.

The graphic data of the three pieces of non-parkable-space-identifying display data 101 shown in FIG. 16 is graphic data having a setting including a fence or a box in which only the frame is red and other surfaces other than the frame are transparent. Note that although the red color is set as the frame color in this example, this is just an example and another color may be set. Further, graphic data to which a pattern or texture is added may be used.

Next, an example of graphic data of the parkable-space-identifying display data 102 will be described with reference to FIG. 17.

In FIG. 6, FIG. 10, and FIG. 11 described above, an example in which a blue plane image parallel to a parking plane of a parkable space is output as the graphic data of the parkable-space-identifying display data 102 has been described.

Also the parkable-space-identifying display data 102 is not limited to such a plane image, and other graphic data may be used. As an example of the parkable-space-identifying display data 102, the following three types of images (graphic data) are shown in FIG. 17: (a) a blue plane image; (b) a blue fence image (upright or inclined); and (c) a blue box image. As the parkable-space-identifying display data 102, for example, one of these three types of images can be used.

The (a) blue plane image corresponds to the graphic data described with reference to FIG. 6, FIG. 10, and FIG. 11. That is, the transparency is higher toward the front side of the parking area (parking entrance/exit side) and the transparency is lower toward the rear side of the parking area. That is, the (a) blue plane image is plain-type graphic data (virtual object) having a setting that the blue color becomes clearer toward the rear side of the parking area. Each of the (b) and (c) images has a setting that the transparency is higher toward the contact surface side and the transparency is lower toward the upper side of the contact surface. That is, the blue color is output more strongly toward the upper side of the contact surface. Note that although the blue color is set in this example, this is just an example and another color may be set. Further, graphic data to which a pattern or texture is added may be used.

Figure 17:
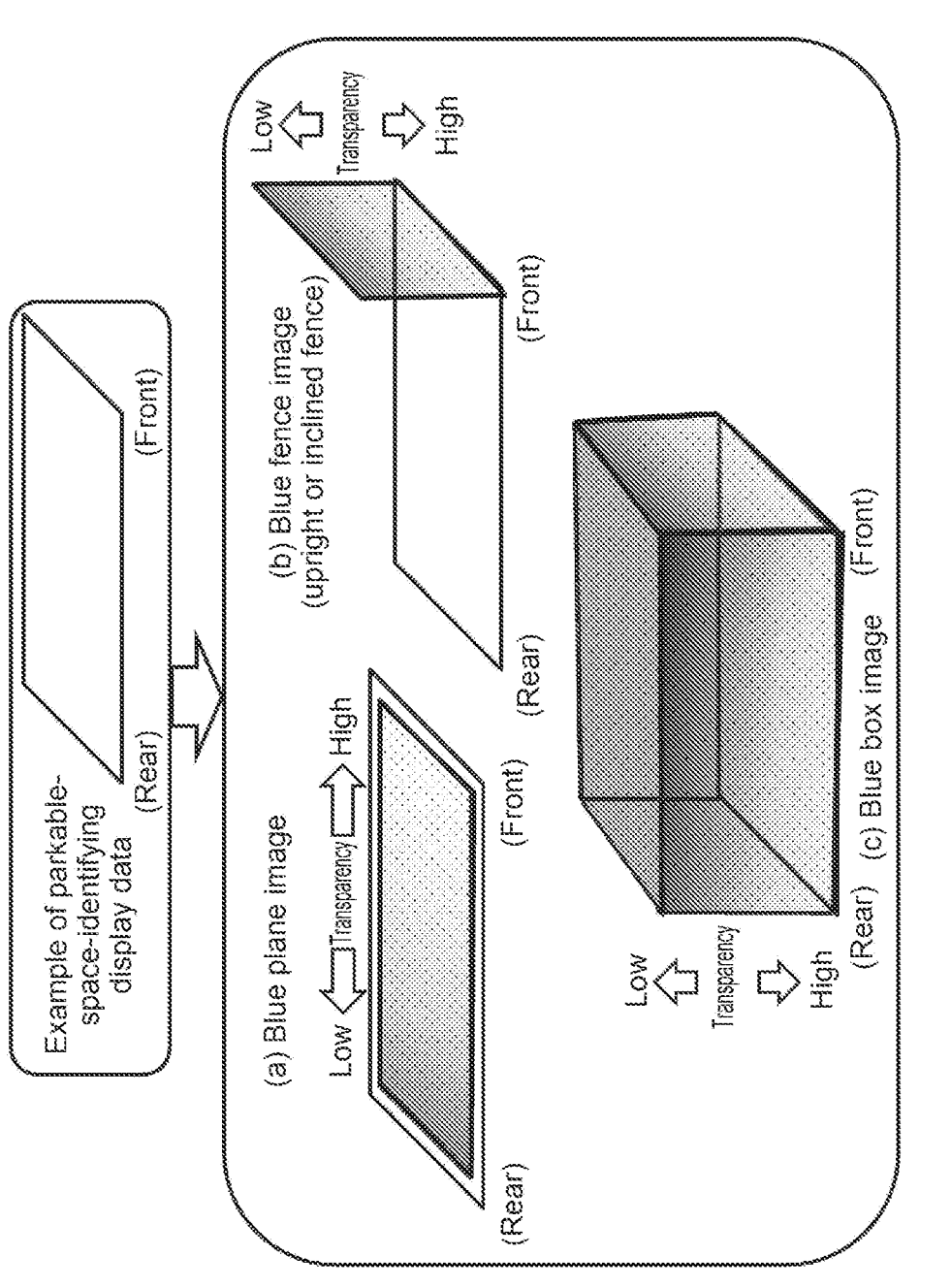
FIG. 17 is a diagram describing a specific example of the display data generated by the information processing apparatus according to the embodiment of the present disclosure.
Figure 18:
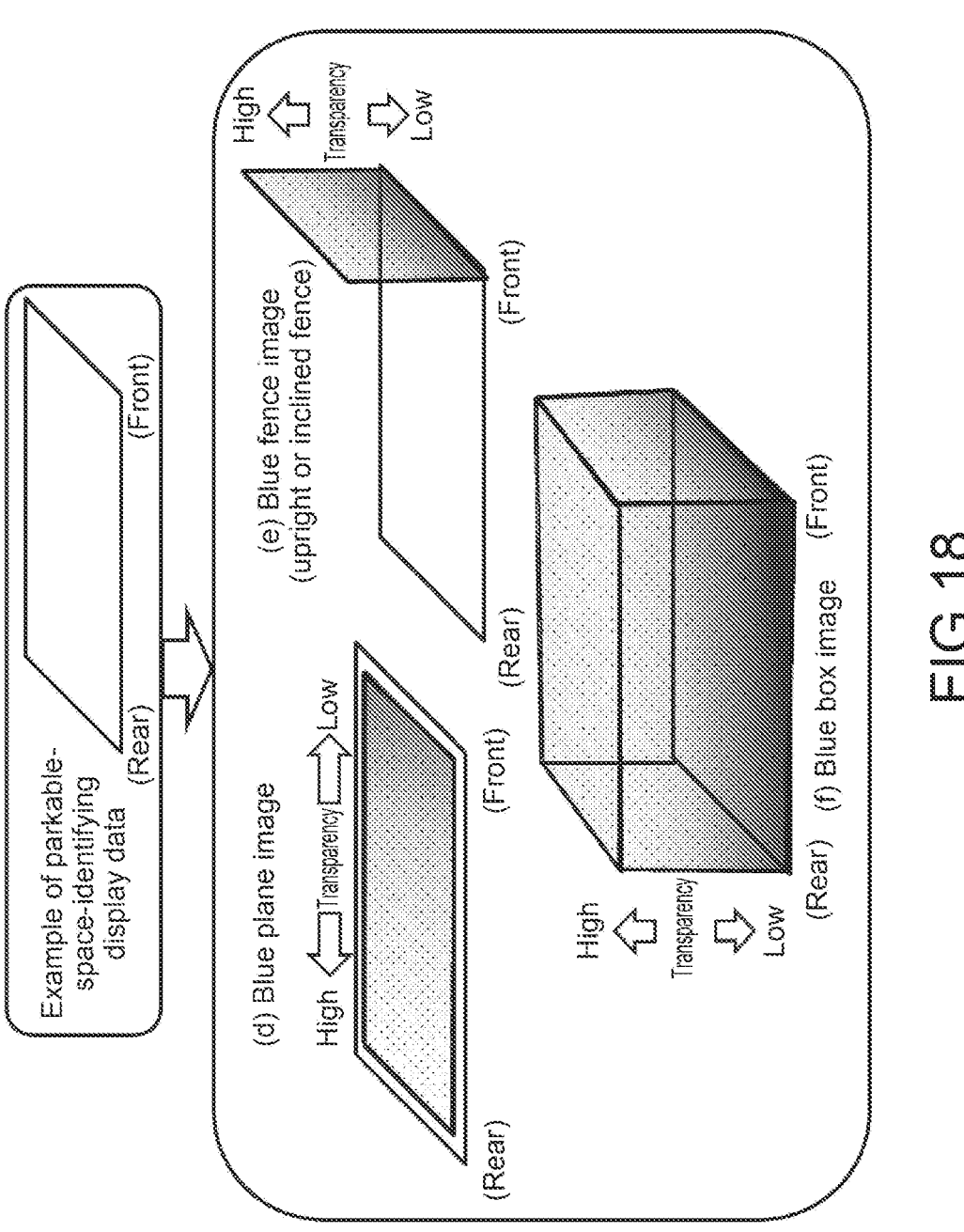
FIG. 18 is a diagram describing a specific example of the display data generated by the information processing apparatus according to the embodiment of the present disclosure.

Further, FIG. 18 shows an example in which the transparency setting of the parkable-space-identifying display data 102 described with reference to FIG. 17 is reversed. The following three types of images (graphic data) are shown: (d) a blue plane image; (c) a blue fence image (upright or inclined); and (f) a blue box image.

The (d) blue plane image is an image in which the transparency setting of the (a) blue plane image described with reference to FIG. 17 is reversed. That is, the (d) blue plane image has a setting that the transparency is lower and the blue output is larger toward the front side of the parking area (parking entrance/exit side) and the transparency is higher and the blue output is smaller toward the rear side of the parking area. That is, the (d) blue plane image is plain-type graphic data (virtual object) having a setting that the blue color becomes clearer toward the front of the parking area.

Each of the (b) and (c) images has a setting that the transparency is lower toward the contact surface side and the transparency is higher toward the upper side of the contact surface. That is, the blue color is output more strongly toward the contact surface. Note that although the blue color is set in this example, this is just an example and another color may be set. Further, graphic data to which a pattern or texture is added may be used.

Each of the modified examples of FIG. 14 to FIG. 16 described as specific examples of the non-parkable-space-identifying display data 101 can be used also for the parkable-space-identifying display data 102. That is, the following modified examples are possible.

(1) Setting described with reference to FIG. 14 in which the entire surface is translucent with uniform transparency (this setting can be applied to all of the (a) plane type in FIG. 17, the (b) fence type in FIG. 17, and the (c) box type in FIG. 17.

(2) Setting described with reference to FIG. 15 in which the entire surface is opaque (this setting can be applied to all of the (a) plane type in FIG. 17, the (b) fence type in FIG. 17, and the (c) box type in FIG. 17)

(3) Setting described with reference to FIG. 16 in which the internal area is transparent and a color frame is provided (this setting can be applied to all of the (a) plane type in FIG. 17, the (b) fence type in FIG. 17, and the (c) box type in FIG. 17)

Note that as described above, the information processing apparatus of the vehicle 10 according to the embodiment of the present disclosure analyzes, on the basis of detection information of a sensor mounted on the vehicle 10 or information received from an external apparatus such as a parking lot management server, whether each of the parking spaces in the parking lot 20 is parkable or non-parkable. However, in the case where these pieces of information are unclear, for example, whether or not a vehicle is present in the parking division cannot be clearly determined on the basis of the detection information of the sensor mounted on the vehicle 10 in some cases. In this case, the information processing apparatus generates display data and presents the display data to the driver (user), the display data being obtained by superimposing graphic data unique to a parkable/non-parkable-unknown space on the parking division included in the actual image taken by a camera, whether or not it is parkable or non-parkable being unknown in the parkable/non-parkable-unknown space.

The graphic data of the parkable/non-parkable-unknown space needs to be data different from the non-parkable-space-identifying display data 101 and the parkable-space-identifying display data 102. An example of graphic data of parkable/non-parkable-unknown-space-identifying display data will be described with reference to FIG. 19.

Figure 19:
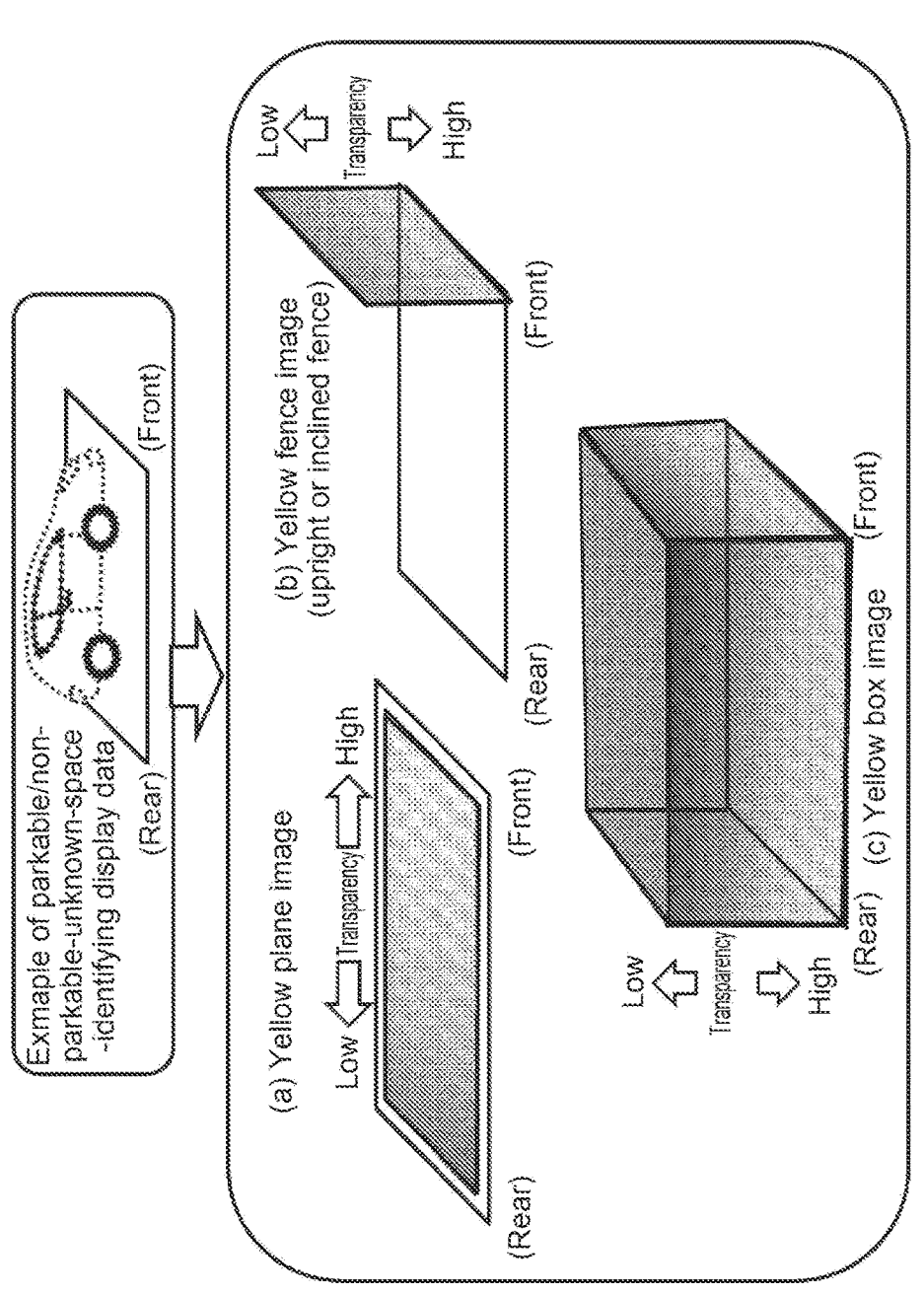
FIG. 19 is a diagram describing a specific example of the display data generated by the information processing apparatus according to the embodiment of the present disclosure.

As an example of the parkable/non-parkable-unknown-space-identifying display data, the following three types of images (graphic data) are shown in FIG. 19: (a) a yellow plane image; (b) a yellow fence image (upright or inclined); and (c) a yellow box image. As the parkable/non-parkable-unknown-space-identifying display data, for example, one of these three types of images can be used.

The (a) yellow plane image has higher transparency toward the front side of the parking area (parking entrance/exit side) and lower transparency toward the rear side of the parking area. That is, the (a) yellow plane image is plain-type graphic data (virtual object) having a setting that the blue color becomes clearer toward the rear side of the parking area. Each of the (b) and (c) images has a setting that the transparency is higher toward the contact surface side and the transparency is lower toward the upper side of the contact surface. That is, the yellow color is output more strongly toward the upper side of the contact surface. Note that although the yellow color is set in this example, this is just an example and another color may be set. Further, graphic data to which a pattern or texture is added may be used.

Figure 20:
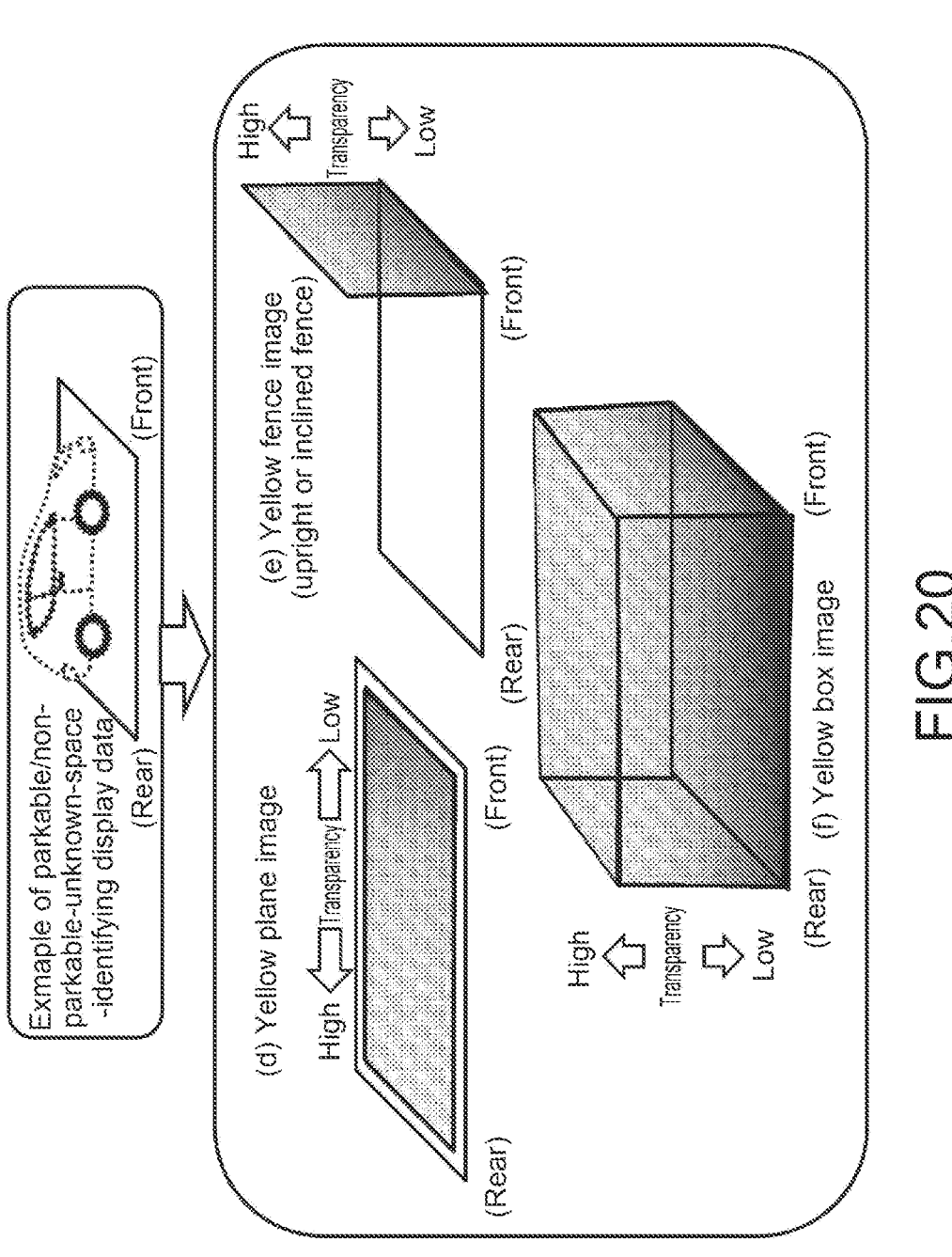
FIG. 20 is a diagram describing a specific example of the display data generated by the information processing apparatus according to the embodiment of the present disclosure.

Further, FIG. 20 shows an example in which the transparency setting of the parkable/non-parkable-unknown-space-identifying display data described with reference to FIG. 19 is reversed. The following three types of images (graphic data) are shown: (d) a yellow plane image; (e) a yellow fence image (upright or inclined); and (f) a yellow box image.

The (d) yellow plane image is an image in which the transparency setting of the (a) yellow plane image described with reference to FIG. 19 is reversed. That is, the (d) yellow plane image has a setting that the transparency is lower and the yellow output is larger toward the front side of the parking area (parking entrance/exit side) and the transparency is higher and the yellow output is smaller toward the rear side of the parking area. That is, the (d) yellow plane image is plain-type graphic data (virtual object) having a setting that the yellow color becomes clearer toward the front side of the parking area.

Each of the (b) and (c) images has a setting that the transparency is lower toward the contact surface side and the transparency is higher toward the upper side of the contact surface. That is, the yellow color is output more strongly toward the contact surface. Note that although the yellow color is set in this example, this is just an example and another color may be set. Further, graphic data to which a pattern or texture is added may be used.

Each of the modified examples of FIG. 14 to FIG. 16 described as specific examples of the non-parkable-space-identifying display data 101 can be used also for the parkable/non-parkable-unknown-space-identifying display data. That is, the following modified examples are possible.

(1) Setting described with reference to FIG. 14 in which the entire surface is translucent with uniform transparency (this setting can be applied to all of the (a) plane type in FIG. 19, the (b) fence type in FIG. 10, and the (c) box type in FIG. 19)

(2) Setting described with reference to FIG. 15 in which the entire surface is opaque (this setting can be applied to all of the (a) plane type in FIG. 19, the (b) fence type in FIG. 10, and the (c) box type in FIG. 19)

(3) Setting described with reference to FIG. 16 in which the internal area is transparent and a color frame is provided (this setting can be applied to all of the (a) plane type in FIG. 19, the (b) fence type in FIG. 10, and the (c) box type in FIG. 19)

Note that the non-parkable-space-identifying display data 101, the parkable-space-identifying display data 102, and the parkable/non-parkable-unknown-space-identifying display data are pieces of display data having different display properties. For example, these pieces of display data have different colors or different patterns.

The non-parkable-space-identifying display data, the parkable-space-identifying display data, and the parkable/non-parkable-unknown-space-identifying display data according to the embodiment of the present disclosure can be applied not only to a parking lot but also to, for example, a parking space on a road and displayed.

Figure 21:
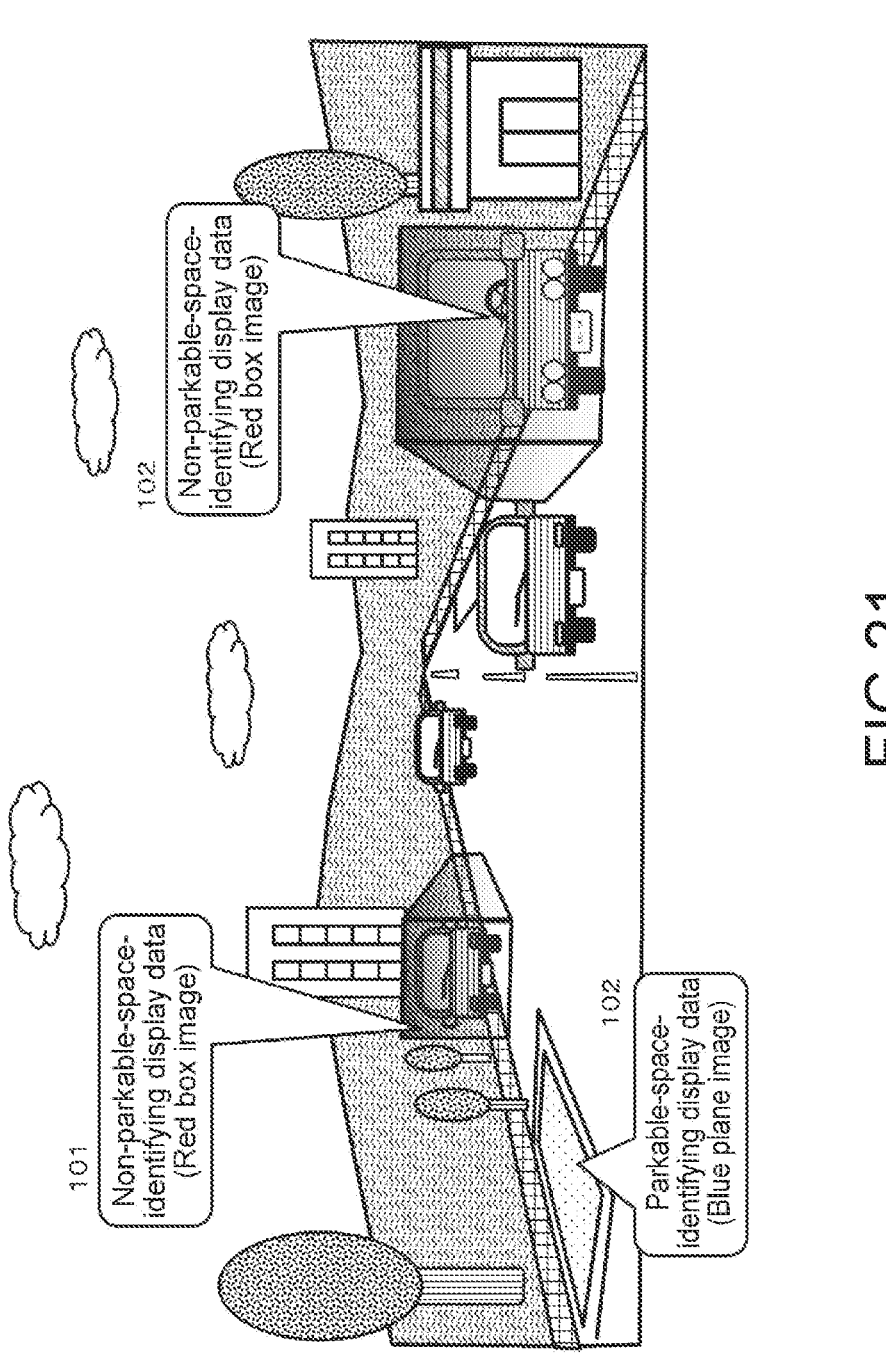
FIG. 21 is a diagram describing a specific example of the display data generated by the information processing apparatus according to the embodiment of the present disclosure.

FIG. 21 is a diagram showing an example of display data displayed on the display unit 50 of the vehicle 10 travelling on a road. Parking division areas are provided on both sides of the road on which the vehicle 10 is travelling. A vehicle can be parked in the parking division area in the case where it is not occupied by another vehicle.

The information processing apparatus according to the embodiment of the present disclosure, which is mounted on the vehicle 10 travelling on the road, takes an image of the state in front of the road on which the vehicle 10 is travelling by the camera, generates an AR image obtained by superimposing the above-mentioned non-parkable-space-identifying display data, parkable-space-identifying display data or parkable/non-parkable-unknown-space-identifying display data on the captured image, and displays the AR image on the display unit. An example of this display data is the display data shown in FIG. 21.

Note that the information processing apparatus according to the embodiment of the present disclosure analyzes, on the basis of the detection information of the sensor mounted on the vehicle 10 or information received from an external apparatus such as a road management server, whether or not each of the parking spaces on the road is parkable or non-parkable. Further, the information processing apparatus according to the embodiment of the present disclosure generates, on the basis of the result of this analysis processing, display data for simply presenting a parkable space of a vehicle to a user who is a vehicle driver and displays the display data on the display data. An example of this display data is the display data shown in FIG. 21.

The display data shown in FIG. 21 displays the red box image (graphic data) that is the non-parkable-space-identifying display data 101 for a parking division area in which another vehicle has been parked, and displays the blue plane image (graphic data) that is the parkable-space-identifying display data 102 for a parking division area in which another vehicle is not parked.

The driver (user) of the vehicle 10 travelling on the road can reliably find a parkable position immediately by looking at the image displayed on the display unit 50, i.e., the image shown in FIG. 21, and can smoothly park the vehicle.

<4. Regarding Sequence of Processing Executed by Information Processing Apparatus According to Embodiment of Present Disclosure>

Next, the sequence of processing executed by the information processing apparatus according to the embodiment of the present disclosure will be described.

Figure 22:
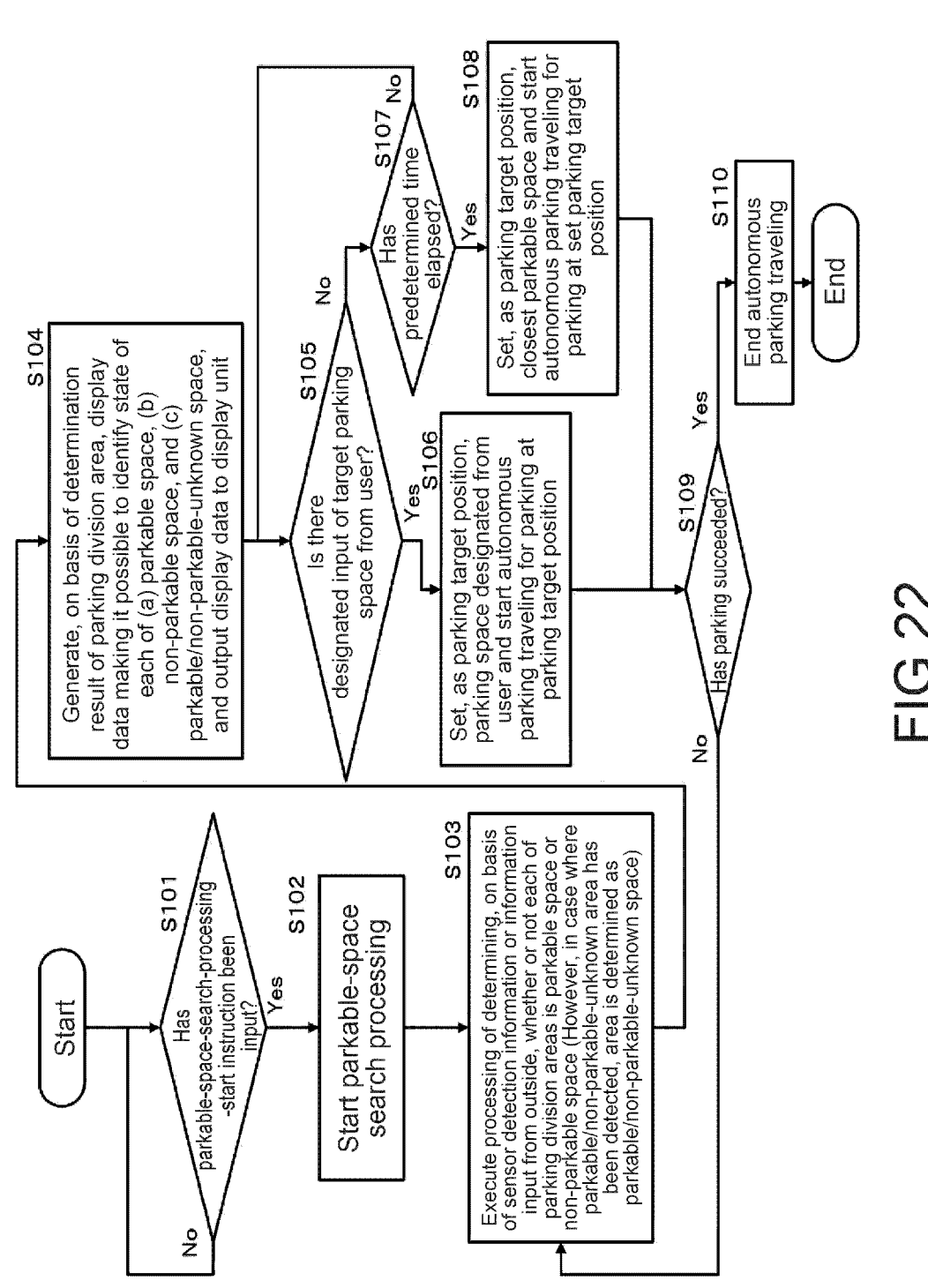
FIG. 22 is a diagram showing a flowchart describing the processing sequence of processing executed by the information processing apparatus according to the embodiment of the present disclosure.

FIG. 22 is a flowchart describing an example of the sequence of processing executed by the information processing apparatus according to the embodiment of the present disclosure mounted on the vehicle 10. The flowchart shown in FIG. 22 is executed under the control of a data processing unit of the information processing apparatus according to the embodiment of the present disclosure. The information processing apparatus according to the embodiment of the present disclosure includes a data processing unit having a program execution function, such as a CPU, and the data processing unit executes the processing according to the flow shown in FIG. 22 in accordance with the program stored in the storage unit in the information processing apparatus. The processing of each Step of the flowchart shown in FIG. 22 will be described.

(Step S101)

First, the data processing unit of the information processing apparatus mounted on the vehicle 10 determines, in Step S101, whether or not a parkable-space-search-processing-start instruction has been input.

This parkable-space-search-processing-start instruction is input from, for example, the driver (user) of the vehicle 10. Note that in the case where the vehicle 10 is an autonomous driving vehicle and a parking lot is set as a destination, an autonomous-driving control unit may output a parkable-space-search-processing-start instruction to the data processing unit instead of a user input.

In Step S101, in the case where it is determined that a parkable-space-search-processing-start instruction has been input, the processing proceeds to Step S102.

(Step S102)

In the case where it is determined in Step S101 that a parkable-space-search-processing-start instruction has been input, the data processing unit starts parkable-space search processing in Step S102.

(Step S103)

Next, in Step S103, the data processing unit executes processing of determining, on the basis of at least one of the detection information of the sensor provided in the vehicle 10 or information input from an external apparatus such as a parking lot management server, whether or not each of the parking division areas is a parkable space or a non-parkable space. However, in the case where a parkable/non-parkable-unknown area has been detected, the area is determined as a parkable/non-parkable-unknown space.

(Step S104)

Next, in Step S104, the data processing unit uses the result of the determination processing in Step S103 to generate display data making it possible to identify the state of each of the (a) parkable space, the (b) non-parkable space, and the (c) parkable/non-parkable-unknown space, and outputs the display data to the display unit.

For example, an AR (Augmented Reality) image that is an augmented reality image obtained by superimposing the three types of graphic data (virtual object) of the non-parkable-space-identifying display data 101, the parkable-space-identifying display data 102, and the parkable/non-parkable-unknown-space-identifying display data described with reference to FIG. 6 to FIG. 21 on the actual image of a parking lot or a road is generated and displayed on the display unit.

(Step S105)

Next, in Step S105, the data processing unit determines whether or not there is a designated input of a target parking space from a user who is the driver.

Note that in the case where the vehicle 10 is an autonomous driving vehicle and a parking lot is set as a destination, a target parking space determined by the autonomous-driving control unit in accordance with a predetermined algorithm may be input to the data processing unit instead of a user input. In this case, in Step S105, the data processing unit may determine there is an input from the autonomous-driving control unit.

In the case where a designated input of a target parking space has been detected in Step S105, the processing proceeds to Step S106. Meanwhile, in the case where no designated input of a target parking space has been detected in Step S105, the processing proceeds to Step S107.

(Step S106)

In the case where a designated input of a target parking space has been detected in Step S105, the data processing unit sets, as a parking target position, the parking space designated from the user (or the autonomous-driving control unit) and starts autonomous parking traveling for parking at the parking target position in Step S106.

(Step S107)

Meanwhile, in the case where no designated input of a target parking space has been detected in Step S105, the data processing unit determines whether or not a predetermined time has elapsed in Step S107. In the case where it is determined that a predetermined time has not elapsed, the data processing unit stands by. Meanwhile, in the case where it is determined that a predetermined time has elapsed, the processing proceeds to Step S108.

(Step S108)

In the case where it is determined in Step S107 that a predetermined time has elapsed, the data processing unit sets, as a parking target position, a parkable space closest to the current position of the vehicle 10 and starts autonomous parking traveling for parking at the set parking target position in Step S108.

(Step S109)

After the processing in Step S106 or Step S108, i.e., the autonomous parking traveling for parking at the parking target position, the data processing unit determines whether or not the parking at the target parking position has succeeded in Step S109.

In the case where the parking has succeeded, the processing proceeds to Step S110. Meanwhile, in the case where the parking has not succeeded, the processing returns to Step S103, and the data processing unit executes, again, processing of determining, on the basis of at least one of the detection information of the sensor provided in the vehicle 10 or information input from an external apparatus such as a parking lot management server, whether or not each of the parking division areas is a parkable space or a non-parkable space.

Note that the case where the parking has not succeeded in Step S109 is, for example, a case where another vehicle has entered the target parking position first.

(Step S110)

In the case where it is determined in Step S109 that the parking has succeeded, the processing proceeds to Step S110. In this case, the data processing unit ends the autonomous parking traveling in Step S110.

As described above, the information processing apparatus according to the embodiment of the present disclosure determines, on the basis of the detection information of the sensor provided in the vehicle 10 or information received from an external apparatus such as a parking lot management server, the empty state of each of the parking division areas, i.e., whether or not each of the parking spaces is parkable or non-parkable, generates the display data as described above with reference to FIG. 6 to FIG. 21 on the basis of the determination result, and displays the display data.

That is, the information processing apparatus generates display data making it possible to identify the state of each of the (a) parkable space, the (b) non-parkable space, and the (c) parkable/non-parkable-unknown space, and outputs the display data to the display unit.

The driver who is a user can easily and reliably recognize the position of a parkable space on the basis of this display data, and select a parking target position from the parkable space. Further, the driver can input information regarding selection of a parking target position and cause autonomous parking processing for parking the vehicle at the target position to be executed.

Note that in the case where the vehicle 10 is a vehicle that cannot perform autonomous parking traveling, the user himself/herself may perform driving for parking in the parkable space.

<5. Regarding Configuration Example of Information Processing Apparatus According to Embodiment of Present Disclosure>

Next, a configuration example of the information processing apparatus according to the embodiment of the present disclosure will be described.

Figure 23:
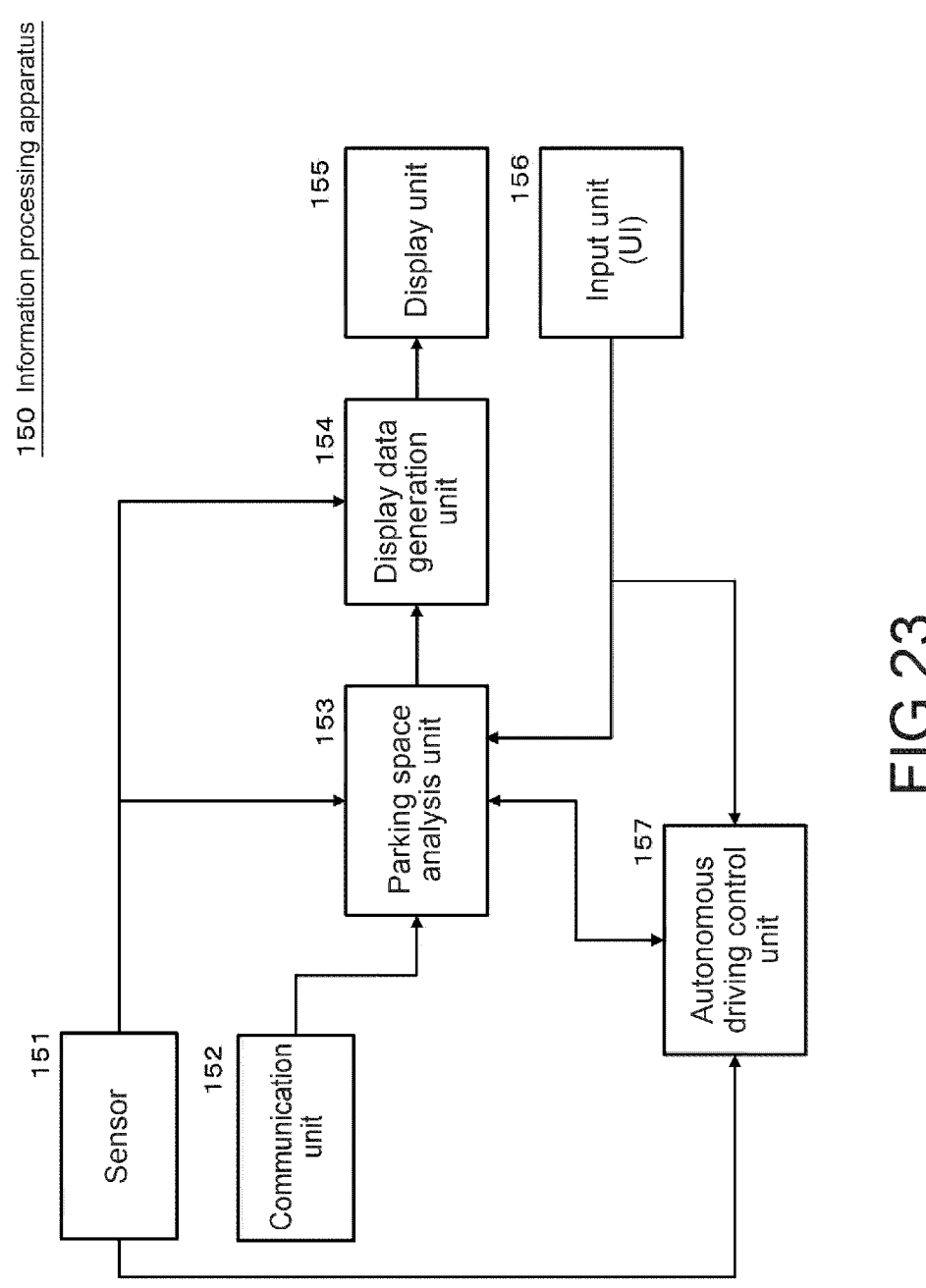
FIG. 23 is a diagram describing a configuration example of the information processing apparatus according to the embodiment of the present disclosure.

FIG. 23 is a block diagram showing an example of an information processing apparatus 150 according to the embodiment of the present disclosure to be mounted on the vehicle 10. As shown in FIG. 23, the information processing apparatus 150 includes a sensor 151, a communication unit (communication circuitry) 152, a parking space analysis unit (parking space analysis circuitry) 153, a display data generation unit (display data generation circuitry) 154, a display unit 155, an input unit (UI) 156, and an autonomous driving control unit (autonomous driving control circuitry) 157.

The sensor 151 is a sensor such as a camera sensor (such as CMOS image sensor), a LiDAR (Light Detection and Ranging) sensor, a RADAR (Radio Detection and Ranging) sensor, and a ToF (Time of Flight) sensor. Note that the LiDAR (Light Detection and Ranging) sensor and the ToF sensor are each a sensor that outputs light such as laser light, analyzes reflected light from an object, and measures the distance from the surrounding object. Note that the RADAR sensor is a sensor that transmits radio signals, analyzes reflected radio signals from an object, and measures the distance from the surrounding object.

The detection information of the sensor 151 is output to the parking space analysis unit 153, the display data generation unit 154, and the autonomous driving control unit 157.

The communication unit 152 communicates with an external apparatus such as a parking lot management server or an external apparatus such as a road management server, receives information regarding whether or not each parking division area is parkable from these external apparatus, and outputs the received information to the parking space analysis unit 153.

The parking space analysis unit 153 inputs sensor detection information from the sensor 151. Further, the parking space analysis unit 153 inputs, via the communication unit 152, the information received from the external apparatus. The parking space analysis unit 153 uses the input information to analyze whether or not each of parking division areas in a parking lot or on a road is parkable. That is, the parking space analysis unit 153 determines whether each of the parking division areas in a parking lot or on a road is a parkable space, a non-parkable space, or a parkable/non-parkable-unknown space.

Note that the parking space analysis unit 153 uses one of the sensor detection information input from the sensor 151 and the received information input via the communication unit 152 from an external apparatus, or both of these pieces of information to determine whether each of the parking division areas in a parking lot or on a road is a parkable space, a non-parkable space, or a parkable/non-parkable-unknown space.

The parkable/non-parkable information of each of the parking division areas analyzed by the parking space analysis unit 153 is output to the display data generation unit 154 and the autonomous driving control unit 157.

The display data generation unit 154 generates, on the basis of the parkable/non-parkable information of each of the parking division areas analyzed by the parking space analysis unit 153, display data to be displayed on the display unit 155.

The display data generation unit 154 generates display data obtained by superimposing three types of graphic data (virtual objects) of non-parkable-space-identifying display data, parkable-space-identifying display data, and parkable/non-parkable-unknown-space-identifying display data on the actual image taken by the camera configuring the sensor 151. That is, the display data generation unit 154 generates an AR (Augmented Reality) image that is an augmented reality image in which a real object and a virtual object is mixed and displays the AR image on the display unit 155.

The display data generated by the display data generation unit 154 is, for example, an AR image obtained by superimposing three types of graphic data (virtual objects) of non-parkable-space-identifying display data, parkable-space-identifying display data, and parkable/non-parkable-unknown-space-identifying display data described above with reference to FIG. 6 to FIG. 21 on an image taken by the camera. The display unit 155 displays the AR image generated by the display data generation unit 154.

The user (driver) who tries to park a vehicle can check a parkable space by looking at the graphic data of the display data displayed on the display unit 155 of the vehicle.

For example, it is possible to easily and reliably determine the area for which the red fence-type non-parkable-space-identifying display data is displayed is a non-parkable space and the area for which the blue plain-type parkable-space-identifying display data is displayed is a parkable space.

The input unit (UI) 156 is a UI to be used by, for example, the driver who is a user to perform processing inputting an instruction to start parkable-space search processing and processing of inputting information regarding selection of a target parking position. The input unit (UI) 156 may include a touch panel configured on the display unit 155.

The input information of the input unit (UI) 156 is input to the parking space analysis unit 153 and the autonomous driving control unit 157. The parking space analysis unit 153 starts parkable-space search processing in response to the instruction to start parkable-space search processing input from the input unit (UI) 156, for example. The autonomous driving control unit 157 performs autonomous parking at the target parking position in accordance with the information regarding selection of a target parking position, which is input from the input unit (UI) 156, for example.

The autonomous driving control unit 157 executes autonomous driving of the vehicle. As described above, in the case where the information regarding selection of a target parking position has been input from the input unit (UI) 156, the autonomous driving control unit 157 executes traveling control for autonomous parking at the target parking position. Note that in the case where the autonomous parking at the target parking position has failed, failure information is notified to the parking space analysis unit 153 and the parking space analysis unit 153 executes the parking-space analysis processing again in response to this notification.

<6. Regarding Hardware Configuration Example of Information Processing Apparatus According to Embodiment of Present Disclosure>

Figure 24:
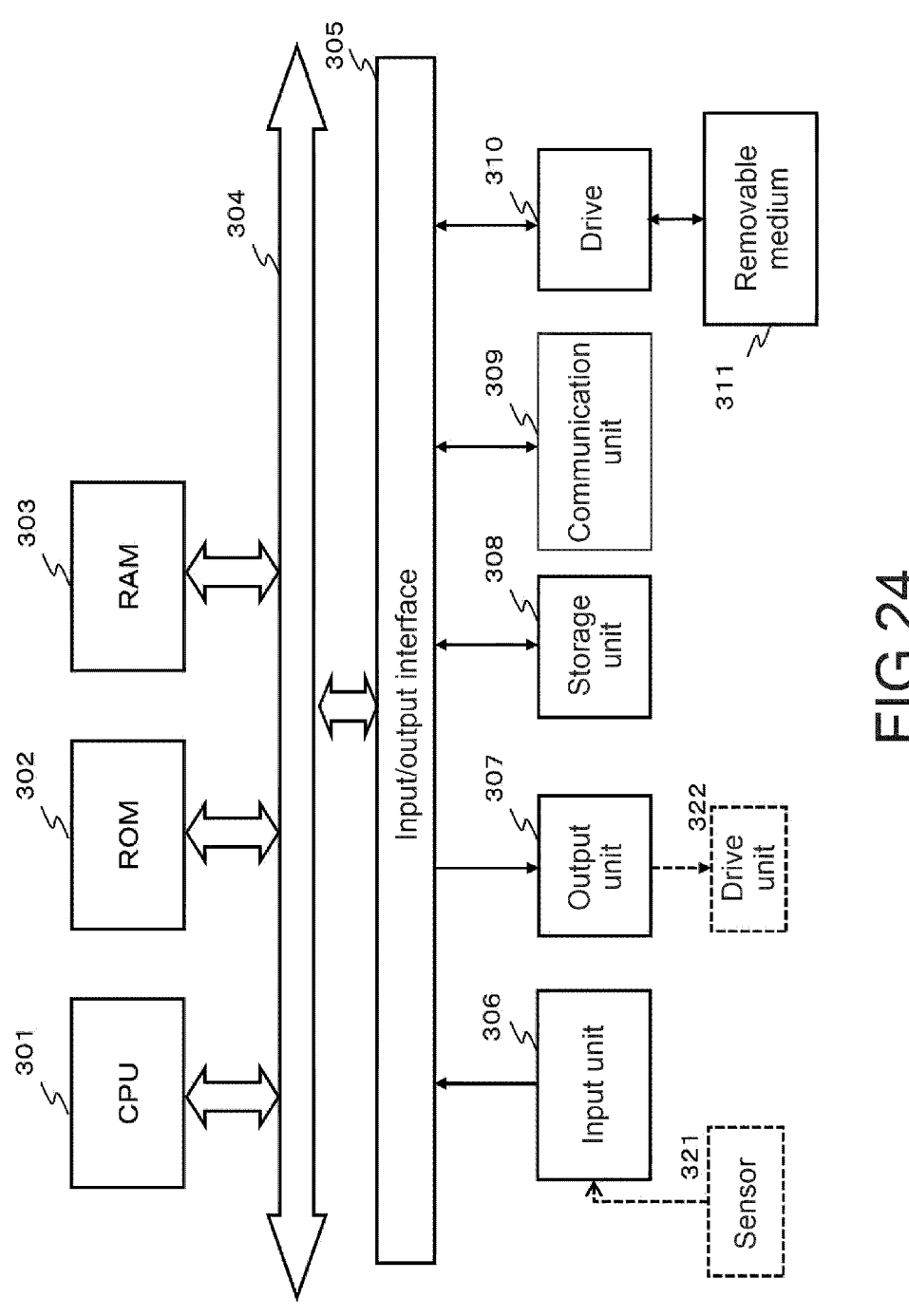
FIG. 24 is a diagram describing a hardware configuration example of the information processing apparatus according to the embodiment of the present disclosure.

Next, a hardware configuration example of the information processing apparatus according to the embodiment of the present disclosure will be described with reference to FIG. 24. Note that the information processing apparatus is mounted in the vehicle 10. The hardware configuration shown in FIG. 24 is a hardware configuration example of the information processing apparatus in the vehicle 10. The hardware configuration shown in FIG. 24 will be described.

A CPU (Central Processing Unit) 301 functions as a data processing unit that executes various types of processing in accordance with a program stored in a ROM (Read Only Memory) 302 or a storage unit 308. For example, the CPU 301 executes processing according to the sequence described in the above-mentioned Example. A RAM (Random Access Memory) 303 stores the program to be executed by the CPU 301, data, and the like. The CPU 301, the ROM 302, and the RAM 303 are connected to each other via a bus 304.

The CPU 301 is connected to an input/output interface 305 via the bus 304, and an input unit 306 and an output unit 307 are connected to the input/output interface 305, the input unit 306 including various switches, a touch panel, a microphone, a user input unit, a situation data acquisition unit of various sensors 321 such as a camera sensor and a LiDAR sensor, and the like, the output unit 307 including a display, a speaker, and the like. Further, the output unit 307 outputs also drive information to a drive unit 322 of the vehicle.

The CPU 301 inputs a command, situation data, and the like input from the input unit 306, executes various types of processing, and outputs the processing result to, for example, the output unit 307. The storage unit 308 connected to the input/output interface 305 includes a hard disk or the like, and stores the program to be executed by the CPU 301 and various types of data. A communication unit 309 functions as a transmission/reception unit of data communication via a network such as the Internet and a local area network, and communicates with an external apparatus. Further, in addition to the CPU, a GPU (Graphics Processing Unit) may be provided as a dedicated processing unit for image information input from the camera.

A drive 310 connected to the input/output interface 305 drives a removable medium 311 such as a magnetic disk, an optical disk, a magneto-optical disk, and a semiconductor memory such as a memory card, and records or reads data.

<7. Regarding Configuration Example of Vehicle>

Next, a configuration example of a vehicle in which the information processing apparatus according to the embodiment of the present disclosure is mounted will be described.

Figure 25:
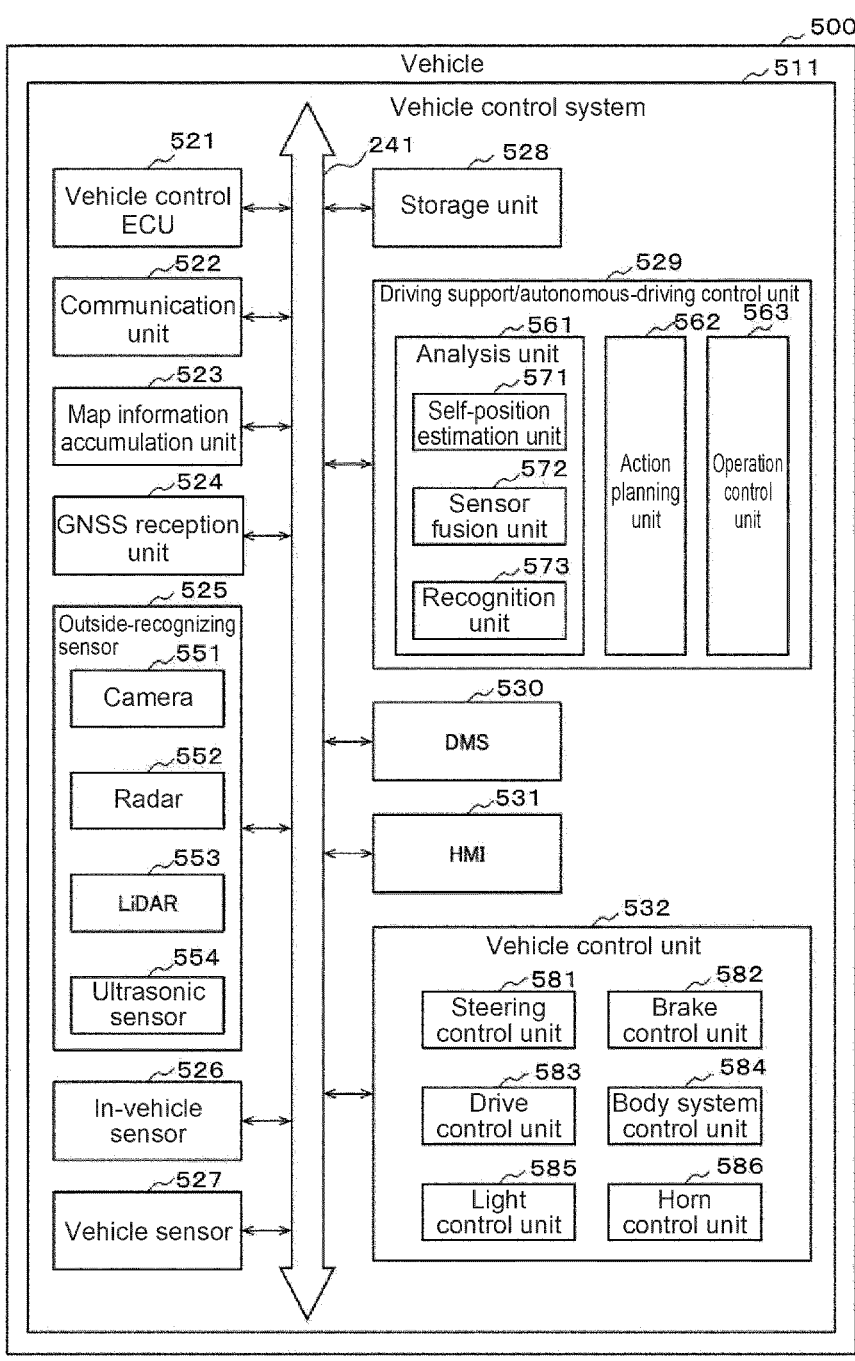
FIG. 25 is a diagram describing a configuration example of a vehicle equipped with the information processing apparatus according to the embodiment of the present disclosure.

FIG. 25 is a block diagram showing a configuration example of a vehicle control system 511 of a vehicle 500 in which the information processing apparatus according to the embodiment of the present disclosure is mounted.

The vehicle control system 511 is provided in the vehicle 500 and performs processing relating to driving support and autonomous driving of the vehicle 500.

The vehicle control system 511 includes a vehicle control ECU (Electronic Control Unit) 521, a communication unit 522, a map information accumulation unit 523, a GNSS (Global Navigation Satellite System) reception unit 524, an outside-recognizing sensor 525, an in-vehicle sensor 526, a vehicle sensor 527, a storage unit 528, a driving support/autonomous-driving control unit 529, a DMS (Driver Monitoring System) 530, an HMI (Human Machine Interface) 531, and a vehicle control unit 532.

The vehicle control ECU (Electronic Control Unit) 521, the communication unit 522, the map information accumulation unit 523, the GNSS reception unit 524, the outside-recognizing sensor 525, the in-vehicle sensor 526, the vehicle sensor 527, the storage unit 528, the driving support/autonomous-driving control unit 529, the driver monitoring system (DMS) 530, the human machine interface (HMI) 531, and the vehicle control unit 532 are communicably connected to each other via a communication network 41. The communication network 241 includes an in-vehicle communication network, a bus, or the like conforming to the digital bidirectional communication standard such as a CAN (Controller Area Network), a LIN (Local Interconnect Network), a LAN (Local Area Network), FlexRay (registered trademark), and Ethernet (registered trademark). The communication network 241 may be used properly depending on the type of data to be communicated. For example, CAN is applied for data relating to vehicle control and Ethernet is applied for large-capacity data. Note that the respective units of the vehicle control system 511 are directly connected to each other using wireless communication assuming relatively short-distance communication, such as near field communication (NFC) and Bluetooth (registered trademark) without the communication network 241 in some cases.

Note that hereinafter, in the case where the respective units of the vehicle control system 511 communicate with each other via the communication network 241, description of the communication network 241 will be omitted. For example, in the case where the vehicle control ECU (Electronic Control Unit) 521 and the communication unit 522 communicate with each other via the communication network 241, it is described that the processor and the communication unit 522 are communicated with each other.

The vehicle control ECU (Electronic Control Unit) 521 includes various processors such as a CPU (Central Processing Unit) and an MPU (MicroProcessing Unit). The vehicle control ECU (Electronic Control Unit) 521 controls the functions of the entire vehicle control system 511 or part thereof.

The communication unit 522 communicates with various devices inside and outside the vehicle, another vehicle, a server, a base station, and the like, transmits/receives various types of data. At this time, the communication unit 522 is capable of performing communication using a plurality of communication methods.

The communication with the outside, which can be executed by the communication unit 522, will be schematically described. The communication unit 522 communicates with a server present on an external network (hereinafter, referred to as the external server) or the like via a base station or an access point by a wireless communication method such as 5G (5th generation mobile communication system), LTE (Long Term Evolution), and DSRC (Dedicated Short Range Communications). The external network with which the communication unit 522 communicates is, for example, the Internet, a cloud network, or a network unique to a business operator. The communication method of the communication by the communication unit 522 with the external network is not particularly limited as long as it is a wireless communication method capable of performing digital bidirectional communication at a predetermined communication speed or more and a predetermined distance or more.

Further, for example, the communication unit 522 is capable of communicating with a terminal present in the vicinity of the own vehicle using a P2P (Peer To Peer) technology. The terminal present in the vicinity of the own vehicle is, for example, a terminal worn by a moving object that moves at a relatively low speed such as a pedestrian and a bicycle, a terminal installed at a fixed position in a store or the like, or an MTC (Machine Type Communication) terminal. Further, the communication unit 522 is capable of performing V2X communication. The V2X communication is communication between the own vehicle and others such as vehicle-to-vehicle communication with another vehicle, vehicle-to-infrastructure communication with a roadside device or the like, vehicle-to-home communication with a home, and vehicle-to-pedestrian communication with a terminal owned by a pedestrian.

The communication unit 522 is capable of receiving, from the outside, a program for updating software that controls the operation of the vehicle control system 511, for example (Over The Air). The communication unit 522 is capable of further receiving, from the outside, map information, traffic information, information around the vehicle 500, and the like. Further, for example, the communication unit 522 is capable of transmitting, to the outside, information relating to the vehicle 500 or information around the vehicle 500. Examples of the information relating to the vehicle 500 transmitted by the communication unit 522 to the outside include data indicating the state of the vehicle 500 and the recognition result by a recognition unit 573. Further, for example, the communication unit 522 performs communication corresponding to the vehicle emergency call system such as ecall.

The in-vehicle communication that can be executed by the communication unit 522 will be schematically described. The communication unit 522 is capable of communicating with each device in the vehicle using, for example, wireless communication. The communication unit 522 is capable of performing wireless communication with the device in the vehicle by a communication method capable of performing digital bidirectional communication at a predetermined communication speed or more by wireless communication such as a wireless LAN, Bluetooth, NFC, and WUSB (Wireless USB). The present disclosure is not limited thereto, and the communication unit 522 is capable of communicating with each device in the vehicle using wired communication. For example, the communication unit 522 is capable of communicating with each device in the vehicle by wired communication via a cable connected to a connection terminal (not shown). The communication unit 522 is capable of communicating with each device in the vehicle by a communication method capable of performing digital bidirectional communication at a predetermined communication speed or more by wired communication such as USB (Universal Serial Bus), HDMI (registered trademark) (High-Definition Multimedia Interface), and MHL (Mobile High-definition Link).

Note that the device in the vehicle represents, for example, a device that is not connected to the communication network 241 in the vehicle. As the device in the vehicle, for example, a mobile device or wearable device owned by a passenger such as a driver, an information device that is brought into the vehicle and temporarily installed, and the like are assumed.

For example, the communication unit 522 receives electromagnetic waves transmitted by vehicle information and communication system (VICS) (registered trademark) including a radio wave beacon, an optical beacon, and FM multiplex broadcasting.

The map information accumulation unit 523 accumulates one or both of the map acquired from the outside and the map created by the vehicle 500. For example, the map information accumulation unit 523 accumulates a three-dimensional high-precision map, a global map that has precision lower than that of the high-precision map but covers a wider area, and the like.

The high-precision map is, for example, a dynamic map, a point cloud map, or a vector map. The dynamic map is, for example, a map including four layers of dynamic information, quasi-dynamic information, quasi-static information, and static information, and is provided from the external server or the like to the vehicle 500. The point cloud map is a map including point clouds (point cloud data). Note that the vector map refers to a map conforming to ADAS (Advanced Driver Assistance System), in which traffic information such as lanes and positions of traffic lights are associated with a point cloud map.

The point cloud map and the vector map may be provided from, for example, the external server, or may be created by the vehicle 500 on the basis of the sensing result by a radar 552, a LiDAR 553, and the like as a map for matching with a local map described below and accumulated in the map information accumulation unit 523. Further, in the case where a high-precision map is provided from the external server or the like, for example, map data of several hundred meters square relating to the planned route through which the vehicle 500 will travel is acquired from the external server or the like in order to reduce the communication capacity.

The GNSS reception unit 524 receives a GNSS signal from a GNSS satellite and acquires position information of the vehicle 500. The received GNSS signal is supplied to the driving support/autonomous-driving control unit 529. Note that the GNSS reception unit 524 does not necessary use the method using a GNSS signal and may acquire position information using a beacon.

The outside-recognizing sensor 525 includes various sensors used for recognizing the external situation of the vehicle 500 and supplies sensor data from each sensor to the respective units of the vehicle control system 511. The type and number of the sensors included in the outside-recognizing sensor 525 are arbitrary.

For example, the outside-recognizing sensor 525 includes a camera 551, the radar 552, the LiDAR (Light Detection and Ranging, Laser Imaging Detection and Ranging) 553, and an ultrasonic sensor 554. The present disclosure is not limited thereto, and the outside-recognizing sensor 525 may include one or more of sensors of the camera 551, the radar 552, the LiDAR 553, and the ultrasonic sensor 554. The numbers of cameras 551, radars 552, LiDARs 553, and ultrasonic sensors 554 are not particularly limited as long as they can be practically installed in the vehicle 500. Further, the type of the sensor included in the outside-recognizing sensor 525 is not limited to this example, and the outside-recognizing sensor 525 may include other types of sensors. An example of the sensing area of each sensor included in the outside-recognizing sensor 525 will be described below.

Note that the imaging method of the camera 551 is not particularly limited as long as distance measurement can be performed. For example, as the camera 551, a camera of various imaging methods, such as a ToF (Time Of Flight) camera, a stereo camera, a monocular camera, and an infrared camera, can be applied as necessary. The present disclosure is not limited thereto, and the camera 551 does not necessarily perform distance measurement and may be simply for acquiring a captured image.

Further, for example, the outside-recognizing sensor 525 may include an environment sensor for detecting the environment for the vehicle 500. The environment sensor is a sensor for detecting the environment including weather, climate, and brightness, and may include various sensors such as a raindrop sensor, a fog sensor, a sunshine sensor, a snow sensor, and an illuminance sensor.

Further, for example, the outside-recognizing sensor 525 includes a microphone used for, for example, detecting sound around the vehicle 500 and the position of the sound source.

The in-vehicle sensor 526 includes various sensors for detecting in-vehicle information, and supplies sensor data from each sensor to the respective units of the vehicle control system 511. The type and number of various sensors included in the in-vehicle sensor 526 are not particularly limited as long as they can be practically installed in the vehicle 500.

For example, the in-vehicle sensor 526 may include one or more sensors of a camera, a radar, a seating sensor, a steering wheel sensor, a microphone, and a biosensor. As the camera included in the in-vehicle sensor 526, for example, a camera of various imaging methods capable of performing distance measurement, such as a ToF camera, a stereo camera, a monocular camera, and an infrared camera, can be used. The present disclosure is not limited thereto, and the camera included in the in-vehicle sensor 526 does not necessarily perform distance measurement and may be simply for acquiring a captured image. The biosensor included in the in-vehicle sensor 526 is provided on, for example, a seat or a steering wheel, and detects various types of biometric information of a passenger such as the driver.

The vehicle sensor 527 includes various sensors for detecting the state of the vehicle 500 and supplies sensor data from each sensor to the respective units of the vehicle control system 511. The type and number of various sensors included in the vehicle sensor 527 are not particularly limited as long as they can be practically installed in the vehicle 500.

For example, the vehicle sensor 527 includes a speed sensor, an acceleration sensor, an angular velocity sensor (gyro sensor), and an inertial measurement unit (IMU) that integrates them. For example, the vehicle sensor 527 includes a steering angle sensor that detects the steering angle of a steering wheel, a yaw rate sensor, an accelerator sensor that detects the amount of operation of an accelerator pedal, and a brake sensor that detects the amount of operation of a brake pedal. For example, the vehicle sensor 527 includes a rotation sensor that detects the RPM of an engine or a motor, a pneumatic sensor that detects a tire pressure, a slip rate sensor that detects the slip rate of a tire, and a wheel speed sensor that detects the rotation speed of a wheel. For example, the vehicle sensor 527 includes a battery sensor that detects the remaining amount and temperature of a battery and an impact sensor that detects the impart from the outside.

The storage unit 528 includes at least one of a non-volatile storage medium or a volatile storage medium, and stores data and a program. The storage unit 528 is used as, for example, an EEPROM (Electrically Erasable Programmable Read Only Memory) and a RAM (Random Access Memory). As a storage medium, a magnetic storage device such as an HDD (Hard Disc Drive), a semiconductor storage device, an optical storage device, and a magneto-optical storage device are applicable. The storage unit 528 records various programs and data used by the respective units of the vehicle control system 511. For example, the storage unit 528 includes an EDR (Event Data Recorder) and a DSSAD (Data Storage System for Automated Driving), and records information regarding the vehicle 500 before and after an event such as an accident and biometric information acquired by the in-vehicle sensor 526.

The driving support/autonomous-driving control unit 529 controls driving support and autonomous driving of the vehicle 500. For example, the driving support/autonomous-driving control unit 529 includes an analysis unit 561, an action planning unit 562, and an operation control unit 563.

The analysis unit 561 performs processing of analyzing the vehicle 500 and the surrounding situation. The analysis unit 561 includes a self-position estimation unit 571, a sensor fusion unit 572, and a recognition unit 573.

The self-position estimation unit 571 estimates the self-position of the vehicle 500 on the basis of the sensor data from the outside-recognizing sensor 525 and the high-precision map accumulated in the map information accumulation unit 523. For example, the self-position estimation unit 571 generates a local map on the basis of the sensor data from the outside-recognizing sensor 525, and matches the local map with the high-precision map to estimate the self-position of the vehicle 500. The position of the vehicle 500 is based on, for example, the center of the rear wheel-to-axle.

The local map is, for example, a three-dimensional high-precision map or an occupancy grid map created using a technology such as SLAM (Simultaneous Localization and Mapping). The three-dimensional high-precision map is, for example, the above-mentioned point cloud map. The occupancy grid map is a map that is obtained by dividing a three-dimensional or two-dimensional space around the vehicle 500 into grids of a predetermined size and shows the occupied state of an object in units of grids. The occupied state of an object is shown by, for example, the presence or absence of the object or the probability of presence. The local map is also used by, for example, the recognition unit 573 for detecting and recognizing the external situation of the vehicle 500.

Note that the self-position estimation unit 571 may estimate the self-position of the vehicle 500 on the basis of the GNSS signal and the sensor data from the vehicle sensor 527.

The sensor fusion unit 572 performs sensor fusion processing of acquiring new information by combining a plurality of different types of sensor data (e.g., the image data supplied from the camera 551 and the sensor data supplied from the radar 552). Examples of the method of combining different types of sensor data include integration, fusion, and association.

The recognition unit 573 executes detection processing of detecting the external situation of the vehicle 500 and recognition processing of recognizing the external situation of the vehicle 500.

For example, the recognition unit 573 performs the detection processing and recognition processing of the external situation of the vehicle 500 on the basis of information from the outside-recognizing sensor 525, information from the self-position estimation unit 571, information from the sensor fusion unit 572, or the like.

Specifically, for example, the recognition unit 573 performs detection processing and recognition processing of an object around the vehicle 500. The detection processing of an object is, for example, processing of detecting the presence or absence of an object, or the size, shape, position, and movement of the object. The recognition processing of an object is, for example, processing of recognizing the attribute of an object such as a type or identifying a specific object. However, the detection processing and the recognition processing are not necessarily clearly separated from each other and overlap with each other in some cases.

For example, the recognition unit 573 detects an object around the vehicle 500 by performing clustering for classifying point clouds based on the sensor data acquired by the LiDAR 553, the radar 552, or the like into each block of point clouds. As a result, the presence or absence of an object around the vehicle 500, and the size, shape, and position of the object are detected.

For example, the recognition unit 573 detects the movement of an object around the vehicle 500 by performing tracking for following the movement of the block of point clouds classified by the clustering. As a result, the speed and the traveling direction (movement vector) of the object around the vehicle 500 are detected.

For example, the recognition unit 573 detects or recognizes, from the image data supplied from the camera 551, a vehicle, a person, a bicycle, an obstacle, a structure, a road, a traffic light, a traffic sign, a road sign, and the like. Further, the type of an object around the vehicle 500 may be recognized by performing recognition processing such as semantic segmentation.

For example, the recognition unit 573 is capable of performing processing of recognizing traffic rules around the vehicle 500 on the basis of the map accumulated in the map information accumulation unit 523, the estimation result of the self-position by the self-position estimation unit 571, and the recognition result of an object around the vehicle 500 by the recognition unit 573. The recognition unit 573 is capable of recognizing, by this processing, the position and state of the traffic light, the content of the traffic sign and road sign, the content of the traffic regulation, the lane in which the vehicle is capable of travelling, and the like.

For example, the recognition unit 573 is capable of performing recognition processing of the surrounding environment of the vehicle 500. As the surrounding environment to be recognized by the recognition unit 573, the weather, temperature, humidity, brightness, the state of a road surface, and the like are assumed.

The action planning unit 562 creates an action plan of the vehicle 500. For example, the action planning unit 562 creates an action plan by performing processing of route planning and route tracking.

Note that the route planning (Global path planning) is processing of planning a rough route from a start to a goal. This route planning includes also processing of trajectory generation (Local path planning) called trajectory planning, the vehicle 500 being capable of safely and smoothly traveling through the trajectory in the vicinity of the vehicle 500 in the route planned in the route planning considering the kinetic characteristics of the vehicle 500. The route planning and the trajectory generation may be distinguished from each other respectively as the long-term route planning and the short-term route planning or local route planning. A safety priority route represents a concept similar to the trajectory generation, the short-term route planning, or the local route planning.

The route tracking is processing of planning an operation for safely and accurately traveling on a route planned by the route planning within a planned time. The action planning unit 562 is capable of, for example, calculating the target speed and the target angular velocity of the vehicle 500 on the basis of the result of the route tracking processing.

The operation control unit 563 control the operation of the vehicle 500 in order to realize the action plan created by the action planning unit 562.

For example, the operation control unit 563 controls a steering control unit 581, a brake control unit 582, and a drive control unit 583 included in the vehicle control unit 532 described below to perform acceleration/deceleration control and direction control such that the vehicle 500 travels through the trajectory calculated by the trajectory planning. For example, the operation control unit 563 performs coordination control for the purpose of realizing the functions of ADAS, such as collision avoidance, impact mitigation, follow-up driving, vehicle-speed maintaining driving, collision warning of the own vehicle, and lane deviation warning of the own vehicle. For example, the operation control unit 563 performs coordination control for the purpose of autonomous driving for autonomously traveling without an operation of the driver.

The DMS 530 performs authentication processing of the driver, recognition processing of the state of the driver, and the like, on the basis of the sensor data from the in-vehicle sensor 526, the input data input to the HMI 531 described below, and the like. As the state of the driver to be recognized by the DMS 530 in this case, for example, the physical condition, the degree of alertness, the degree of concentration, the degree of fatigue, the gaze direction, the degree of drunkenness, the driving operation, and the posture are assumed.

Note that the DMS 530 may perform the authentication processing of a passenger other than the driver and the recognition processing of the state of the passenger. Further, for example, the DMS 530 may perform the recognition processing of the situation in the vehicle on the basis of the sensor data from the in-vehicle sensor 526. As the situation in the vehicle to be recognized, for example, temperature, humidity, brightness, odor, and the like are assumed.

The HMI 531 inputs various types of data and instructions, and presents various types of data to the driver and the like.

The input of data by the HMI 531 will be schematically described. The HMI 531 includes an input device for a person to input data. The HMI 531 generates an input signal on the basis of the data and instruction input by the input device, and supplies the input signal to the respective units of the vehicle control system 511. The HMI 531 includes, as an input device, an operator such as a touch panel, a button, a switch, and a lever. The present disclosure is not limited thereto, and the HMI 531 may further include an input device capable of inputting information by a method other than the manual operation, e.g., voice or gesture. Further, for example, the HMI 531 may use, as an input device, a remote control device using infrared rays or radio waves, or an externally-connected device such as a movable device and a wearable device that support the operation of the vehicle control system 511.

The presentation of data by the HMI 531 will be schematically described. The HMI 531 generates visual information, auditory information, and haptic information for a passenger the outside of the vehicle. Further, the HMI 531 performs output control of controlling the output, the output content, the output timing, and the output method of these pieces of generated information. The HMI 531 generates and outputs, as the visual information, an image or information indicated by light such as an operation screen, the state display of the vehicle 500, warning display, and a monitor image indicating the situation around the vehicle 500. Further, the HMI 531 generates and outputs, as the auditory information, information indicated by sounds such as voice guidance, a warning sound, and a warning message. Further, the HMI 531 generates and outputs, as the haptic information, information given to the haptic sensation of a passenger by, for example, force, vibration, or movement.

As the output device by which the HMI 531 outputs the visual information, for example, a display device that presents visual information by displaying an image by itself or a projector device that presents visual information by projecting an image can be applied. Note that the display device does not necessarily need to be a display device including a normal display and may be a device that displays visual information within the field of view of a passenger, such as a head-up display, a transmissive display, and a wearable device having an AR (Augmented Reality) function. Further, the HMI 531 may use, as an output device that outputs visual information, a display device included in a navigation device, an instrument panel, a CMS (Camera Monitoring System), an electronic mirror, a lamp, or the like provided in the vehicle 500.

As an output device by which the HMI 531 outputs auditory information, for example, an audio speaker, a headphone, or an earphone can be applied.

As an output device by which the HMI 531 outputs haptic information, for example, a haptic device using a haptic technology can be applied. The haptic device is provided at a portion of the vehicle 500 that a passenger touches, such as a steering wheel and a seat.

The vehicle control unit 532 controls the respective units of the vehicle 500. The vehicle control unit 532 includes the steering control unit 581, the brake control unit 582, the drive control unit 583, a body system control unit 584, a light control unit 585, and a horn control unit 586.

The steering control unit 581 detects and controls the state of the steering system of the vehicle 500, for example. The steering system includes, for example, a steering mechanism including a steering wheel and the like, an electric power steering, and the like. The steering control unit 581 includes, for example, a control unit such as an ECU that controls the steering system, an actuator that drives the steering system, and the like.

The brake control unit 582 detects and controls the state of the brake system of the vehicle 500, for example. The brake system includes, for example, a brake mechanism including a brake pedal and the like, an ABS (Antilock Brake System), a regenerative brake mechanism, and the like. The brake control unit 582 includes, for example, a control unit such as an ECU that controls the brake system.

The drive control unit 583 detects and controls the state of the drive system of the vehicle 500, for example. The drive system includes, for example, a drive-force generating device for generating a drive force, such as an accelerator pedal, an internal combustion engine, and a drive motor, a drive-force transmission mechanism for transmitting a drive force to wheels, and the like. The drive control unit 583 includes, for example, a control unit such as an ECU that controls the drive system.

The body system control unit 584 detects and controls the state of the body system of the vehicle 500, for example. The body system includes, for example, a keyless entry system, a smart key system, a power window device, a power seat, an air conditioner, an airbag, a seat belt, a shift lever, and the like. The body system control unit 584 includes, for example, a control such as an ECU that controls the body system.

The light control unit 585 detects and controls the state of various lights of the vehicle 500. As the light to be controlled, for example, a headlight, a backlight, a fog light, a turn signal, a brake light, a projection, a bumper display, and the like are assumed. The light control unit 585 includes a control unit such as an ECU that controls the light.

The horn control unit 586 detects and controls the state of a car horn of the vehicle 500. The horn control unit 586 includes, for example, a control unit such as an ECU that controls the car horn.

Figure 26:
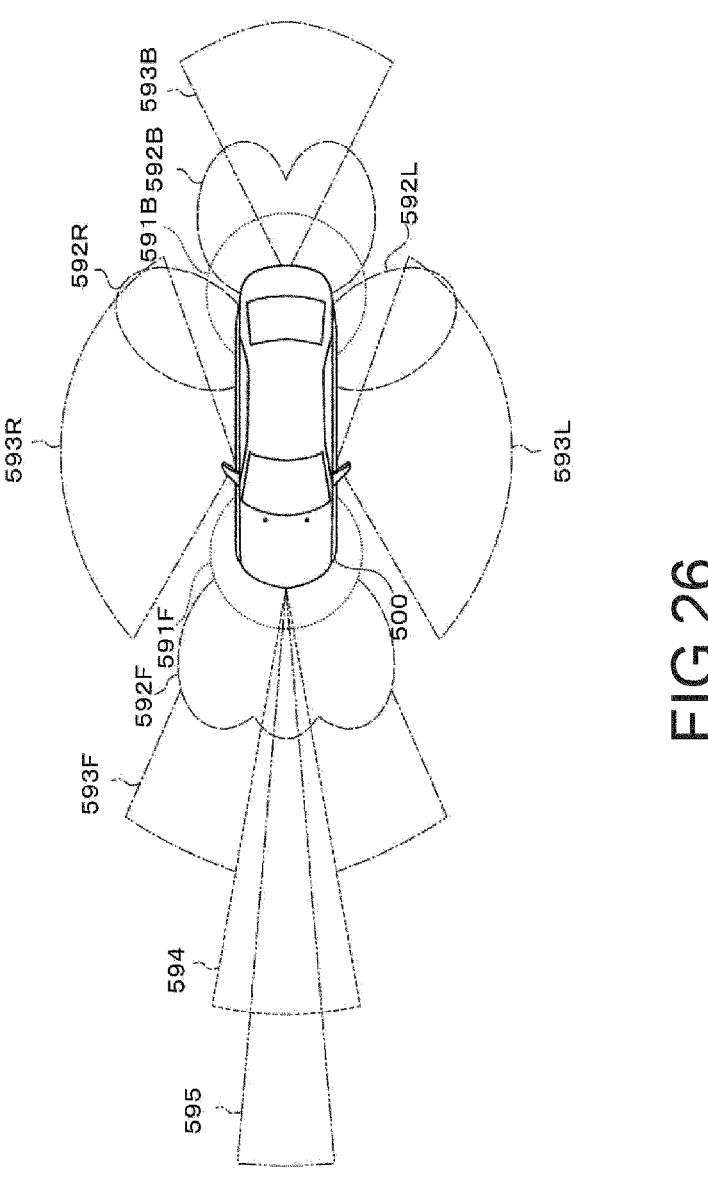
FIG. 26 is a diagram describing a configuration example of a sensor of the vehicle equipped with the information processing apparatus according to the embodiment of the present disclosure.

FIG. 26 is a diagram showing an example of a sensing area of the camera 551, the radar 552, the LiDAR 553, the ultrasonic sensor 554, and the like of the outside-recognizing sensor 525 shown in FIG. 25. Note that in FIG. 26, a state of the vehicle 500 viewed from the upper surface is schematically shown, the left end side is the front end (front) side of the vehicle 500, and the right end side is the rear end (rear) side of the vehicle 500.

A sensing area 591F and a sensing area 591B each show an example of the sensing area of the ultrasonic sensor 554. The sensing area 591F covers the periphery of the front end of the vehicle 500 by the plurality of ultrasonic sensors 554. The sensing area 591B covers the periphery of the rear end of the vehicle 500 by the plurality of ultrasonic sensors 554.

The sensing results in the sensing area 591F and the sensing area 591B are used for, for example, parking support of the vehicle 500.

A sensing area 592F to a sensing area 592B each show an example of the sensing area of the radar 552 for a short distance or middle distance. The sensing area 592F covers a range to a position farther than the sensing area 591F in front of the vehicle 500. The sensing area 592B covers a range to a position farther than the sensing area 591B behind the vehicle 500. The sensing area 592L covers the rear periphery of the vehicle 500 on the left side surface. The sensing area 592R covers the rear periphery of the vehicle 500 on the right side surface.

The sensing result in the sensing area 592F is used for, for example, detecting a vehicle or a pedestrian present in the front of the vehicle 500. The sensing result in the sensing area 592B is used for, for example, a function of preventing collision behind the vehicle 500. The sensing results in the sensing area 592L and the sensing area 592R are used for, for example, detecting an object in a blind spot on the side of the vehicle 500.

A sensing area 593F to a sensing area 593B each show an example of the sensing area of the camera 551. The sensing area 593F covers a range to a position farther than the sensing area 592F in front of the vehicle 500. The sensing area 593B covers a range to a position farther than the sensing area 592B behind the vehicle 500. The sensing area 593L covers the periphery of the vehicle 500 on the left side surface. The sensing area 593R covers the periphery of the vehicle 500 on the right side surface.

The sensing result in the sensing area 593F can be used for, for example, recognition of a traffic light and a traffic sign, a lane deviation prevention support system, or an automatic headlight control system. The sensing result in the sensing area 593B can be used for, for example, parking support and a surround view system. The sensing results in the sensing area 593L and the sensing area 593R can be used for, for example, a surround view system.

A sensing area 594 shows an example of the sensing area of the LiDAR 553. The sensing area 594 covers a range to a position farther than the sensing area 593F in front of the vehicle 500. Meanwhile, the sensing area 594 has a narrower range in the right and left direction than the sensing area 593F.

The sensing result in the sensing area 594 is used for, for example, detecting an object such as a peripheral vehicle.

A sensing area 595 shows an example of the sensing area of the radar 552 for a long distance. The sensing area 595 covers a range to a position farther than the sensing area 594 in front of the vehicle 500. Meanwhile, the sensing area 595 has a narrower range in the right and left direction than the sensing area 594.

The sensing result in the sensing area 595 is used for, for example, ACC (Adaptive Cruise Control), emergency brake, collision avoidance.

Note that the sensing area of each sensor of the camera 551, the radar 552, the LiDAR 553, and the ultrasonic sensor 554 included in the outside-recognizing sensor 525 may have various configurations other than that shown in FIG. 26. Specifically, the ultrasonic sensor 554 may sense also the side of the vehicle 500, or the LiDAR 553 may sense the rear of the vehicle 500. Further, the installation position of each sensor is not limited to each of the above-mentioned examples. Further, the number of sensors may be one or two or more.

<8. Summary of Configuration of Present Disclosure>

The embodiments of the present disclosure have been described above in details with reference to the specific Examples. However, it is clear that those skilled in the art could make modifications or alterations thereto without departing from the essence of the present disclosure. In other words, the present disclosure has been described illustratively, and should not be restrictively interpreted. The claims should be considered in order to determine the scope of the present disclosure.

Note that the technology disclosed in the present specification can take the following configurations.

(1) An information processing apparatus, comprising:
a display data generation unit configured to:
receive an image obtained by imaging surroundings of a vehicle;
generate display data representing at least one parking division area; and
superimpose the display data on the image, wherein
the display data include an upward extension surface extending from a vehicle contact surface of the at least one parking division area.

(2) The information processing apparatus according to (1), wherein
the generated display data comprise a fence-type graphic data having the upward extension surface extending from the vehicle contact surface.

(3) The information processing apparatus according to (1), wherein
the generated display data comprise a box-type graphic data having the upward extension surface extending from the vehicle contact surface.

(4) The information processing apparatus according to (1) or (2), wherein
the at least one parking division area comprises a non-parkable space and a parkable space, and
the generated display data comprise a fence-type graphic data having an upward extension surface extending from a vehicle contact surface of the non-parkable space, and a plane-type graphic data parallel to a vehicle contact surface of the parkable space.

(5) The information processing apparatus according to any one of (1) to (4), wherein
the at least one parking division area comprises a non-parkable space and a parkable space, and
the display data generation unit is configured to generate a non-parkable-space-identifying display data representing the non-parkable space, and a parkable-space-identifying display data representing the parkable space, and wherein
the non-parkable-space-identifying display data has at least one display property that is different from the parkable-space-identifying display data.

(6) The information processing apparatus according to (5), wherein
the non-parkable-space-identifying display data and the parkable-space-identifying display data are different in color, pattern, or both.

(7) The information processing apparatus according to (5) or (6), The information processing apparatus according to claim 5, wherein
the non-parkable-space-identifying display data and the parkable-space-identifying display data are arranged on a common line.

(8) The information processing apparatus according to (5), wherein
the at least one parking division area further comprises a parkable/non-parkable-unknown-space, and
the display data generation unit is configured to generate a parkable/non-parkable-unknown-space-identifying display data representing the parkable/non-parkable-unknown-space.

(9) The information processing apparatus according to (8), wherein
the parkable/non-parkable-unknown-space-identifying display data has at least one different display property from the parkable-space-identifying display data and the non-parkable-space-identifying display data.

(10) The information processing apparatus according to (9), wherein
the parkable/non-parkable-unknown-space-identifying display data and the parkable-space-identifying display data are different in color, pattern, or both, and
the parkable/non-parkable-unknown-space-identifying display data and the non-parkable-space-identifying display data are different in color, pattern, or both.

(11) The information processing apparatus according to any one of (1) to (10), wherein
a transparency of the upward extension surface changes depending on a distance from the vehicle contact surface.

(12) The information processing apparatus according to (11), wherein
the transparency of the upward extension surface decreases with the distance away from the vehicle contact surface.

(13) The information processing apparatus according to (2), wherein
a transparency of the fence-type graphic data decreases with a distance away from the vehicle contact surface.

(14) The information processing apparatus according to (3), wherein
a transparency of the box-type graphic data decreases with a distance away from the vehicle contact surface.

(15) The information processing apparatus according to (4), wherein
a transparency of the plane-type graphic data changes depending on a distance from a front line of the parkable space, the front line indicative of a parking entrance/exit side of the parkable space.

(16) The information processing apparatus according to (15), wherein the plane-type graphic data has a first portion and a second portion, the first portion disposed between the front line of the parkable space and the second portion, and a transparency of the first portion is lower that a transparency of the second portion.

(17) The information processing apparatus according to any one of (1) to (16), further comprising:

a parking space analysis unit configured to provide a determination of whether each parking division area of the at least one parking division area is parkable, and wherein the display data generation unit is configured to generate the display data based on the determination of the parking space analysis unit.

(18) The information processing apparatus according to (17), wherein the parking space analysis unit is configured to generate the determination based on one or both of:

detection information of a sensor mounted on the vehicle; and information received from an external device.

(19) A method for presenting a parkable space to a driver of a vehicle, the method comprising:

receiving an image obtained by imaging surroundings of the vehicle;

generating space-identifying display data representing at least one parking division area, the space-identifying display data comprising an upward extension surface extending from a vehicle contact surface of the at least one parking division area; and superimposing the display data on the image.

(20) An apparatus, comprising:

at least one computer-readable storage medium having stored thereon executable instructions;

at least one processor programmed by the executable instructions to perform a method comprising acts of:

receiving an image obtained by imaging surroundings of a vehicle;

generating space-identifying display data representing at least one parking division area, the space-identifying display data comprising an upward extension surface extending from a vehicle contact surface of the at least one parking division area; and superimposing the display data on the image.

(21) An information processing apparatus, including:

a display data generation unit that generates display data obtained by superimposing, as graphic data, space-identifying display data of at least one of a parkable space or a non-parkable space on an image obtained by imaging surroundings of a vehicle, wherein the display data generation unit generates display data obtained by superimposing, as graphic data having an upward extension surface extending upward from a vehicle contact surface, the space-identifying display data of at least one of a parkable space or a non-parkable space on the image.

(22) An information processing method executed by an information processing apparatus, including:

display data generation processing of generating, by a display data generation unit, display data obtained by superimposing, as graphic data, space-identifying display data of at least one of a parkable space or a non-parkable space on an image obtained by imaging surroundings of a vehicle, in which the display data generation processing includes generating, by the display data generation unit, display data obtained by superimposing, as graphic data having an upward extension surface extending upward from a vehicle contact surface, space-identifying display data of at least one of a parkable space or a non-parkable space on the image.

(23) A program that causes an information processing apparatus to execute information processing, including:

display data generation processing of generating, by a display data generation unit, display data obtained by superimposing, as graphic data, space-identifying display data of at least one of a parkable space or a non-parkable space on an image obtained by imaging surroundings of a vehicle, in which the display data generation processing includes generating, by the display data generation unit, display data obtained by superimposing, as graphic data having an upward extension surface extending upward from a vehicle contact surface, space-identifying display data of at least one of a parkable space or a non-parkable space on the image.

Further, the series of processes described in the specification can be executed by hardware, software, or a composite configuration of them. When a process is performed using software, a program in which a processing sequence is recorded can be installed on a memory in a computer incorporated in dedicated hardware to be executed, or the program can be installed on a general-purpose computer capable of performing various processes to be executed. For example, the program can be recorded in a recording medium in advance. The program does not necessarily need to be installed on a computer from a recording medium, and may be received via a network such as a LAN (Local Area Network) and the Internet and installed on a recording medium such as a built-in hard disk.

Note that the various processes described in the specification do not necessarily need to be executed in chronological order in accordance with the description, and may be executed in parallel or individually in accordance with the processing capacity of the device that executes the processes or as necessary. Further, the system in the specification represents a logical set configuration of a plurality of devices, and the devices of the respective configurations are in the same casing in some cases but do not necessarily need to be in the same casing.

INDUSTRIAL APPLICABILITY

As described above, in accordance with the configuration of an Example of the present disclosure, a configuration that makes it possible to generate display data and display the display data on a display unit is realized, the display data making it possible to easily and reliably identify a parkable space and a non-parkable space. Specifically, for example, there is provided a display data generation unit that generates display data obtained by superimposing, as graphic data, space-identifying display data of at least one of a parkable space or a non-parkable space on an image obtained by imaging surroundings of a vehicle. The display data generation unit generates display data, outputs the display data on a display unit to display the display data, the display data being obtained by superimposing, as fence-type or box-type graphic data having an upward extension surface extending upward from a vehicle contact surface, space-identifying display data of at least one of a parkable space or a non-parkable space on a captured image. With this configuration, a configuration that makes it possible to generate display data and display the display data on a display unit is realized, the display data making it possible to easily and reliably identify a parkable space and a non-parkable space.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST 10 vehicle
20 parking lot
50 display unit
101 non-the parkable-space-identifying display data
102 parkable-space-identifying display data
150 information processing apparatus
151 sensor
152 communication unit
153 parking space analysis unit
154 display data generation unit
155 display unit
156 input unit (UI)
157 autonomous driving control unit
301 CPU
302 ROM
303 RAM
304 bus
305 input/output interface
306 input unit
307 output unit
308 storage unit
309 communication unit
310 drive
311 removable medium
321 sensor
322 drive unit

The invention claimed is:

1. An information processing apparatus, comprising:
a parking space analyzer configured to:
    check a parkable/non-parkable state of each parking division area of at least one parking division area to determine a parking status of the at least one parking division area,
    wherein the parking status of each parking division area is determined in the following sequence of steps:
    1) Determine the parkable/non-parkable state of the at least one parking division area,
    2) If the parkable/non-parkable state of the at least one parking division area cannot be clearly determined, then the parking status of the at least one parking division area is designated as unknown, and
    3) If the parkable/non-parkable state of the at least one parking division area is determined as parkable, then the parking status of the at least one parking division area is designated as parkable, and
    4) If the parkable/non-parkable state of the at least one parking division area is determined as non-parkable, then the parking status of the at least one parking division area is designated as non-parkable; and
a display data generator configured to:
    receive an image obtained by imaging surroundings of a vehicle;
    generate display data representing the state of at least one parking division area; and
    superimpose the display data on the image, wherein the display data includes an upward extension surface extending from a vehicle contact surface of the at least one parking division area.

2. The information processing apparatus according to claim 1, wherein the generated display data comprise a fence-type graphic data having the upward extension surface extending from the vehicle contact surface.

3. The information processing apparatus according to claim 1, wherein the generated display data comprise a box-type graphic data having the upward extension surface extending from the vehicle contact surface.

4. The information processing apparatus according to claim 1, wherein the at least one parking division area comprises a non-parkable space and a parkable space, and the generated display data comprise a fence-type graphic data having an upward extension surface extending from a vehicle contact surface of the non-parkable space, and a plane-type graphic data parallel to a vehicle contact surface of the parkable space.

5. The information processing apparatus according to claim 1, wherein the at least one parking division area comprises a non-parkable space and a parkable space, and the display data generator is configured to generate non-parkable-space-identifying display data representing the non-parkable space, and parkable-space-identifying display data representing the parkable space, and wherein the non-parkable-space-identifying display data has at least one display property that is different from the parkable-space-identifying display data.

6. The information processing apparatus according to claim 5, wherein the non-parkable-space-identifying display data and the parkable-space-identifying display data are different in color, pattern, or both.

7. The information processing apparatus according to claim 5, wherein the non-parkable-space-identifying display data and the parkable-space-identifying display data are arranged on a common line.

8. The information processing apparatus according to claim 5, wherein the at least one parking division area further comprises an unknown-space, and the display data generator is configured to generate unknown-space-identifying display data representing the unknown-space.

9. The information processing apparatus according to claim 8, wherein the unknown-space-identifying display data has at least one different display property from the parkable-space-identifying display data and the non-parkable-space-identifying display data.

10. The information processing apparatus according to claim 9, wherein the unknown-space-identifying display data and the parkable-space-identifying display data are different in color, pattern, or both, and the unknown-space-identifying display data and the non-parkable-space-identifying display data are different in color, pattern, or both.

11. The information processing apparatus according to claim 1, wherein a transparency of the upward extension surface changes depending on a distance from the vehicle contact surface.

12. The information processing apparatus according to claim 11, wherein the transparency of the upward extension surface decreases with the distance away from the vehicle contact surface.

13. The information processing apparatus according to claim 2, wherein a transparency of the fence-type graphic data decreases with a distance away from the vehicle contact surface.

14. The information processing apparatus according to claim 3, wherein a transparency of the box-type graphic data decreases with a distance away from the vehicle contact surface.

15. The information processing apparatus according to claim 4, wherein a transparency of the plane-type graphic data changes depending on a distance from a front line of the parkable space, the front line indicative of a parking entrance/exit side of the parkable space.

16. The information processing apparatus according to claim 15, wherein the plane-type graphic data has a first portion and a second portion, the first portion disposed between the front line of the parkable space and the second portion, and a transparency of the first portion is lower than a transparency of the second portion.

17. The information processing apparatus according to claim 1, further comprising: a parking space analyzer configured to provide a determination of whether each parking division area of the at least one parking division area is parkable, and wherein the display data generator is configured to generate the display data based on the determination of the parking space analyzer.

18. The information processing apparatus according to claim 17, wherein the parking space analyzer is configured to generate the determination based on one or both of: detection information of a sensor mounted on the vehicle; and information received from an external device.

19. A method for presenting a parkable space to a driver of a vehicle, the method comprising:

checking a parkable/non-parkable state of each parking division area of at least one parking division area to determine a parking status of the at least one parking division area, wherein the parking status of each parking division area is determined in the following sequence of steps:

1) Determine the parkable/non-parkable state of the at least one parking division area, 2) If the parkable/non-parkable state of the at least one parking division area cannot be clearly determined, then the parking status of the at least one parking division area is designated as unknown, and 3) If the parkable/non-parkable state of the at least one parking division area is determined as parkable, then the parking status of the at least one parking division area is designated as parkable, and 4) If the parkable/non-parkable state of the at least one parking division area is determined as non-parkable, then the parking status of the at least one parking division area is designated as non-parkable; and receiving an image obtained by imaging surroundings of the vehicle;

generating space-identifying display data representing at least one parking division area, the space-identifying display data comprising an upward extension surface extending from a vehicle contact surface of the at least one parking division area; and superimposing the display data on the image, wherein the display data includes an upward extension surface extending from a vehicle contact surface of the at least one parking division area.

20. A non-transitory computer readable medium storing instructions that, when executed by a computer, cause the computer to execute the processes of:

checking a parkable/non-parkable state of each parking division area of at least one parking division area to determine a parking status of the at least one parking division area, wherein the parking status of each parking division area is determined in the following sequence of steps:

1) Determine the parkable/non-parkable state of the at least one parking division area, 2) If the parkable/non-parkable state of the at least one parking division area cannot be clearly determined, then the parking status of the at least one parking division area is designated as unknown, and 3) If the parkable/non-parkable state of the at least one parking division area is determined as parkable, then the parking status of the at least one parking division area is designated as parkable, and 4) If the parkable/non-parkable state of the at least one parking division area is determined as non-parkable, then the parking status of the at least one parking division area is designated as non-parkable; and receiving an image obtained by imaging surroundings of a vehicle;

generating space-identifying display data representing at least one parking division area, the space-identifying display data comprising an upward extension surface extending from a vehicle contact surface of the at least one parking division area; and superimposing the display data on the image, wherein the display data includes an upward extension surface extending from a vehicle contact surface of the at least one parking division area.

* * * * *